(12) United States Patent
Bailey et al.

(10) Patent No.: US 7,872,993 B2
(45) Date of Patent: Jan. 18, 2011

(54) METHOD AND SYSTEM FOR CLASSIFYING DATA PACKETS

(75) Inventors: Kevin R. Bailey, Granada Hills, CA (US); Prashant R. Rao, Oak Park, CA (US); Vincent Magret, Oak Park, CA (US); Chiang Yeh, Sierra Madre, CA (US)

(73) Assignee: Alcatel Lucent, Paris (FR)

( * ) Notice: Subject to any disclaimer, the term of this patent is extended or adjusted under 35 U.S.C. 154(b) by 64 days.

(21) Appl. No.: 12/261,396

(22) Filed: Oct. 30, 2008

(65) Prior Publication Data

US 2010/0110936 A1 May 6, 2010

(51) Int. Cl.
*H04L 12/28* (2006.01)
(52) U.S. Cl. .................... 370/256; 709/252
(58) Field of Classification Search ............. 370/256, 370/254; 709/252
See application file for complete search history.

(56) References Cited

U.S. PATENT DOCUMENTS

| | | | | |
|---|---|---|---|---|
| 6,134,599 | A * | 10/2000 | Chiu et al. | 709/252 |
| 6,397,324 | B1 * | 5/2002 | Barry et al. | 712/225 |
| 2003/0193959 | A1 * | 10/2003 | Lui et al. | 370/401 |
| 2007/0195714 | A1 * | 8/2007 | Schales et al. | 370/254 |

FOREIGN PATENT DOCUMENTS

| EP | 1 453 253 A | 9/2004 |
|---|---|---|
| EP | 1 515 501 A | 3/2005 |

OTHER PUBLICATIONS

Jon Bentley and Bob Sedgewick, "Ternary Search Trees", http:www.ddj.com/windows/184410528;jsessionid=J5OAHM5V32MVUQSNDLPSKHSCJUN N2JVN?_requestid=115264, Apr. 1, 1998.

Jeremie Bourdon, "Patricia Tries in the Context of Dynamical Systems," Algorithms Seminar, Mar. 19, 2001, http://algo.inria.fr/seminars/sem00-01/bourdon.html.

Readme for Net-Patricia, "Net: Patricia—Patricia Trie perl module for fast IP address lookups," http://search.cpan.org/src/PLONKA/Net-Patricia-1.014/README May 1, 2008.

Harry A. Clampett, Jr., "Randomized Binary Searching With Tree Structures," Communications of the ACM, vol. 7, No. 3, Mar. 1964, pp. 163-165.

Huan Liu, "Routing Table Compaction in Ternary CAM," IEEE Micro, Jan.-Feb. 2002, pp. 58-64.

(Continued)

*Primary Examiner*—Dang T Ton
*Assistant Examiner*—Wei Zhao
(74) *Attorney, Agent, or Firm*—Wall & Tong, LLP

(57) ABSTRACT

Embodiments of the invention provide a method for building a classification tree based on a plurality of rules. Each rule includes multiple fields having different priority levels. The classification tree is built to provide for single pass classification of a received packet according to the multiple rules. The classification tree is built level-by-level, where each level represents one of the priority levels. Building a single level of the classification tree includes: creating, for each of the logical decision paths received from a next higher priority level, a respective sub-tree. The sub-tree includes only nodes and related logical decision paths that are necessary to satisfy rules associated with a respective next higher priority level node. Building of the single level further includes: creating, for each non-lowest priority level, logical decision paths from nodes within the current priority level to a next lower priority level.

20 Claims, 15 Drawing Sheets

OTHER PUBLICATIONS

P. Gupta, et al., "Routing Lookups in Hardware at Memory Access Speeds," IEEE INFOCOM Apr. 1998, vol. 3, pp. 1240-1247, San Francisco.

M. Waldvogel, et al., "Scalable High Speed IP Routing Lookups," Computer Communication Review, a publication of ACM SIGCOMM, vol. 27, No. 4, Oct. 1997. ISSN#0146-4833.

Sasao T: "Ternary decision diagrams. Survey" Multiple-Valued Logic, 1997. Proceedings., 1997 27$^{th}$ International Symposium on Antigonish, NS, Canada May 28-30 1997, Los Alamitos, CA, USA, IEEE Comput. Soc, US, May 28, 1997, pp. 241-250.

International Search Report and the Written Opinion of The International Searching Authority, Or The Declaration, in PCT/US2009/005708, Alcatel Lucent, Applicant, dated Mar. 2, 2010, 15 pages.

* cited by examiner

200

| Rule Number | Field 1 | Field 2 | Field 3 |
|---|---|---|---|
| 1 | A | B | C |
| 2 | A | B | * |
| 3 | B | C | C |
| 4 | * | * | C |

FIG. 2

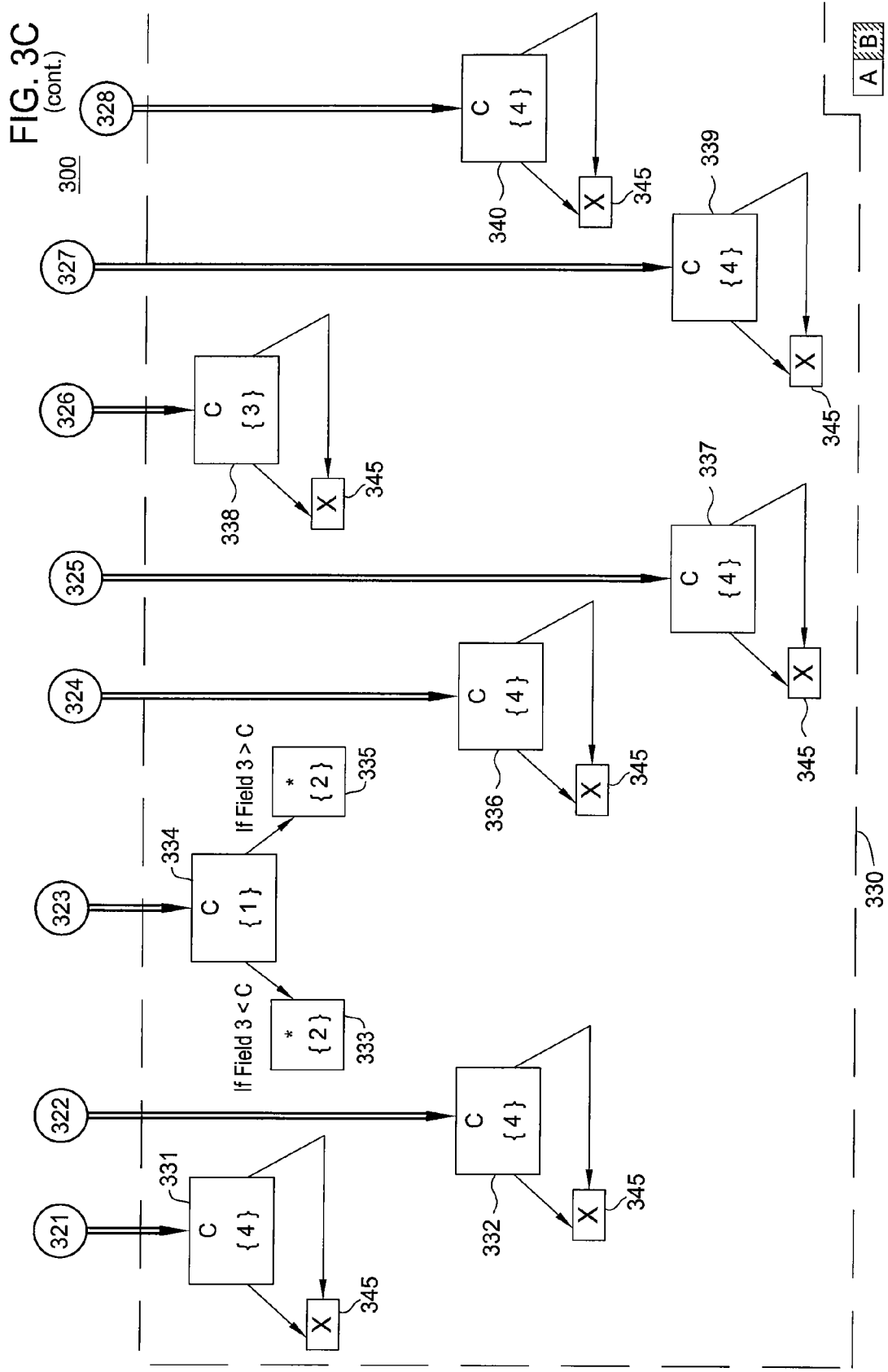

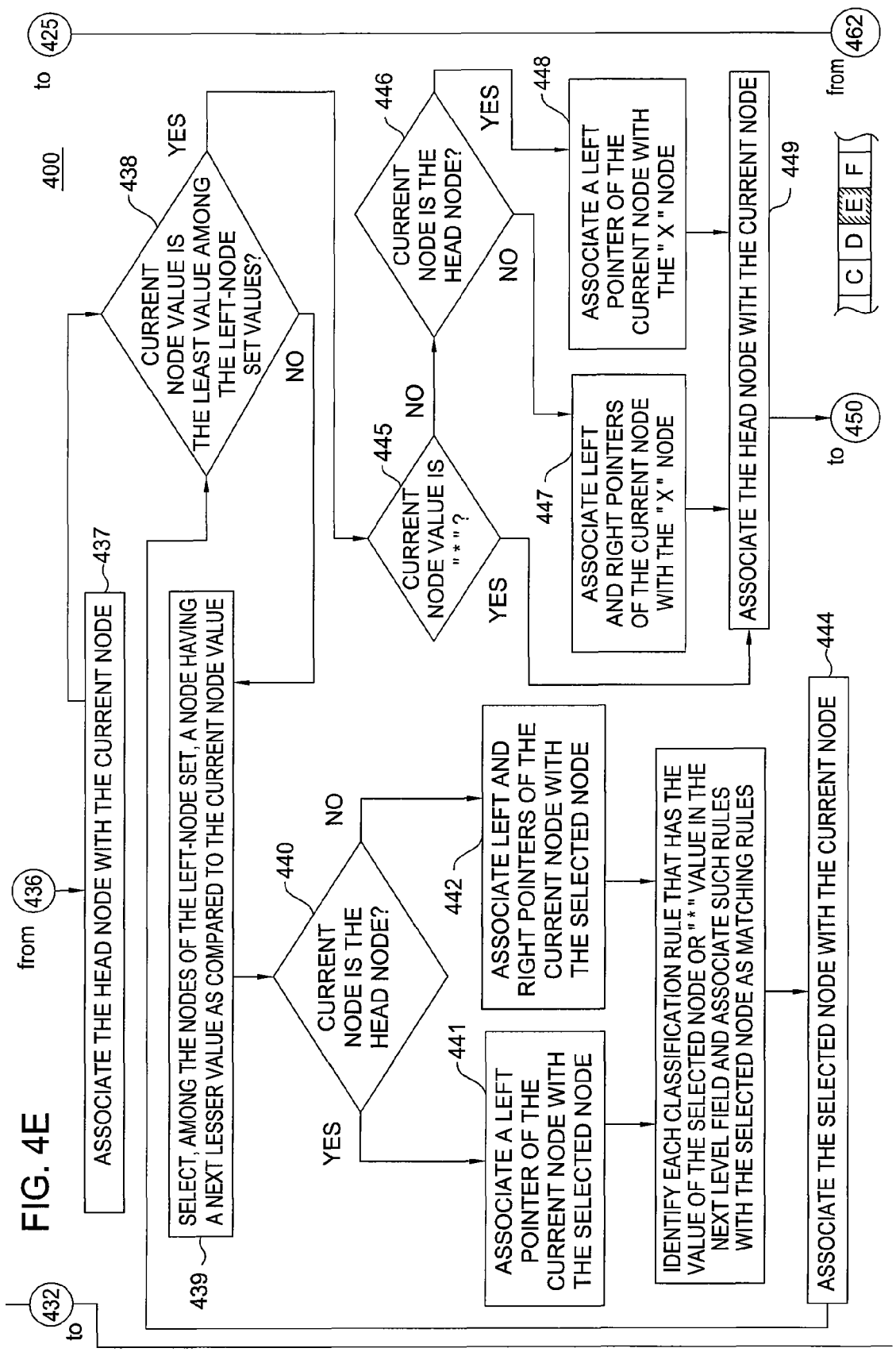

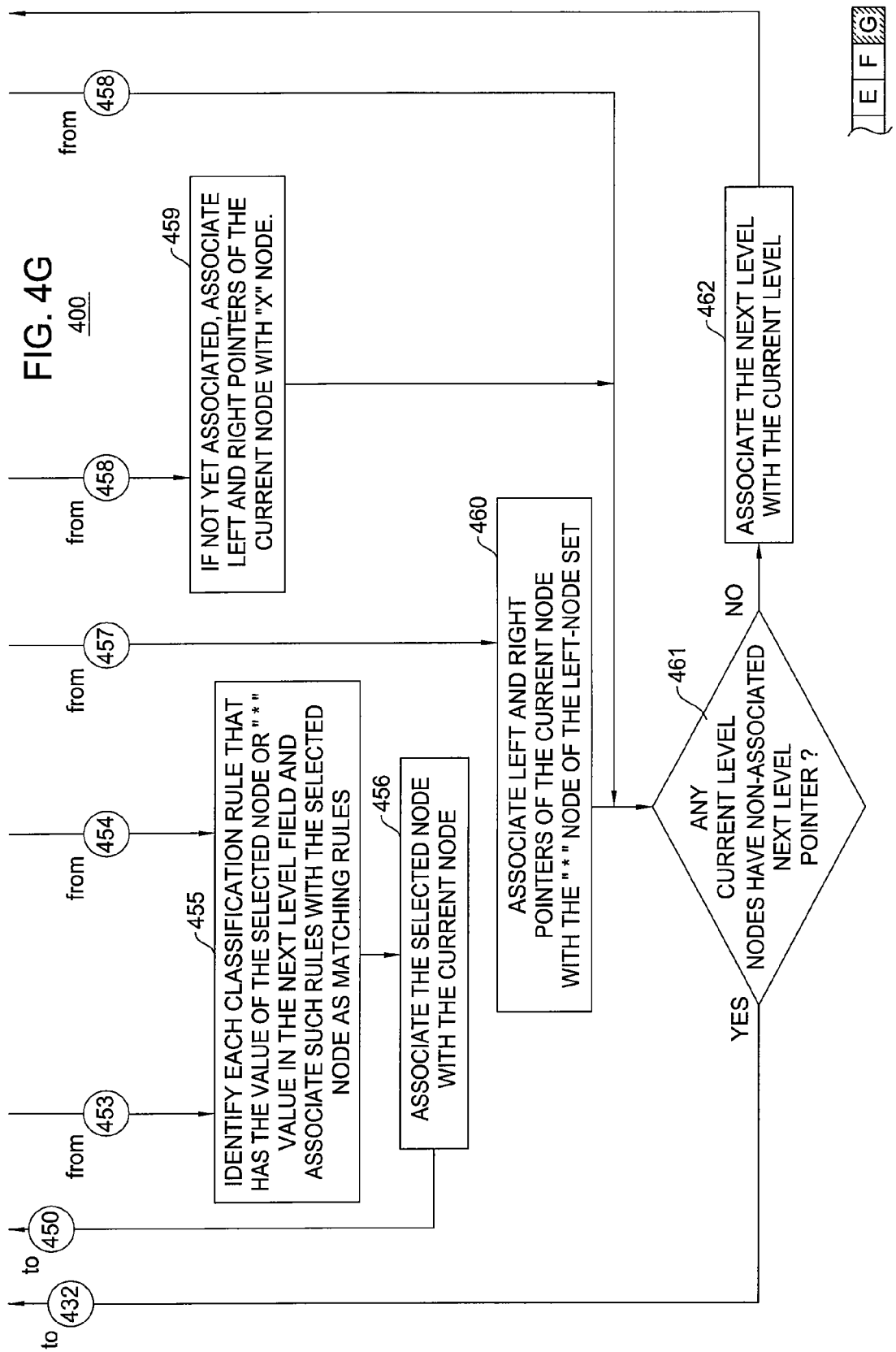

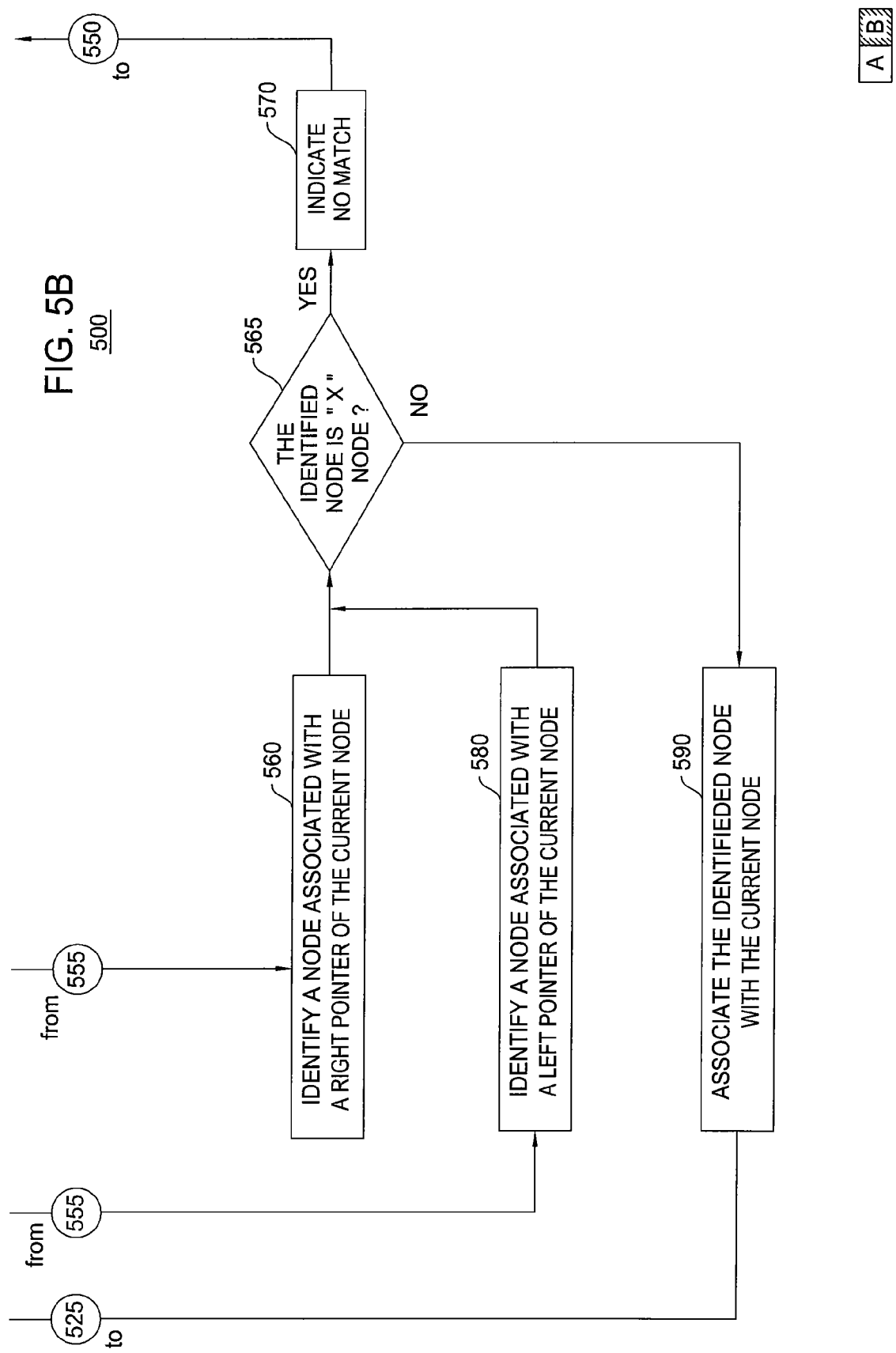

METHOD AND SYSTEM FOR CLASSIFYING DATA PACKETS

FIELD OF THE INVENTION

The invention relates to the field of communications and, more specifically, to classifying data packets for use in communications systems.

BACKGROUND

Network communications often require classifying information units, such as packets, that are transported between various network devices (e.g., routers, switches, terminals, etc.) For example, packets may be examined and classified to support various applications, such as network partitioning, group mobility tracking, security control and enforcement, quality of service support, and so on. In particular, a network component may examine and classify incoming packets using classification rules to determine an action that should be applied to a packet, such as whether the packet should be dropped, transmitted to its destination, re-routed, modified, quarantined, etc. Due to the complexity and customizability of such rules, the classification process is typically implemented as a software application. However, performance of such an application is often slowed by limited processing power of a central processing unit (CPU) running the application and expanded complexity of the application caused by the flexible nature of the classification rules.

To improve on the slow performance, constraints on the complexity of the rules are often enforced. For example, the rules may be limited to a set that that could be easily organized into a binary search tree. However, due to the exact match constraint, rules of sufficient complexity have to be organized in multiple trees rather than a single tree. Because searching multiple trees is significantly slower than searching the single tree, the optimizing advantage of using a binary search tree is compromised.

Another common approach is to employ hash tables, which involves transforming the look-up keys of the classification rules into a statistically favorable hash index associated with the location of the actual rule. While hash tables are easy to implement, due to the exact match constraint multiple passes across different tables are required to implement the desired classification capability. Furthermore, a successful match is not guaranteed even if one does exist.

SUMMARY

Various deficiencies in the prior art are addressed by embodiments of a method and a system for classifying data packets and building a classification structure using a plurality of classification rules. One embodiment provides a method for building a classification tree structure. The classification tree structure is adapted to enable single pass classification of a received packet according to a plurality of rules. Each rule is associated with a plurality of fields, where each field has a priority level. The method for building the classification tree structure includes building a top priority level. To build the top priority level, nodes corresponding to field values of the top priority level fields are created, where if several field values are the same, only one node is created. For each of the created nodes, a respective set of rules matching the node value is identified. The process of building the top priority level further includes: selecting among the created nodes a head node; creating logical decision paths from the head node to the other nodes within the top priority level; and creating logical decision paths from nodes of the top priority level to a next lower priority level.

The method for building a classification tree structure further includes building the remaining priority levels of the classification tree structure, level-by-level. Each of the remaining priority levels is built in the following manner. For each of the logical decision paths received from a next higher priority level, a respective sub-tree is created, where the sub-tree includes only those nodes and related logical decision paths that ate necessary to satisfy rules associated with a respective next higher priority level node. Further, when the remaining priority level is not the lowest priority level, logical decision paths from nodes within the current priority level to a next lower priority level are created.

Another embodiment provides a method for classifying incoming data packets. The method includes receiving a data packet containing a plurality of packet fields where the packet fields are associated with different priority levels. The method further includes determining a classification rule matching the data packet via a single pass of a classification structure. The classification structure includes a plurality of levels, where each level corresponds to one of the priority levels associated with the packet fields. The levels within the classification structure are ordered according to descending priorities from the top of the classification structure to the bottom.

The method further includes, for each level of the classification structure, starting with the top level and moving towards the bottom level, level-by-level, a value of a packet field having the corresponding priority level is compared to nodes of a logical decision path for the packet within the level of the classification structure to find a matching node. The matching node is a node that has the same value as the packet field. For each non-lowest priority level, if the matching node is found, such a matching node defines the logical decision path to a next level of the classification structure. For the lowest priority level, finding the matching node completes the classification process, where the matching node of the lowest priority level identifies a classification rule matching the packet.

Yet another embodiment of the present invention provides a packet processor. The packet processor includes a memory for storing a classification structure and a processor adapted to determine a classification rule matching an incoming data packet using the classification structure stored in the memory. The classification structure represents a plurality of classification rules where each rule has a plurality of fields. Each field is associated with a different priority level. The classification structure includes a plurality of levels where the top level has the highest priority level and each next level has the next lower priority level. The data packet includes a plurality of packet fields where fields have priority levels corresponding to the priority levels of the classification structure.

The packet processor is adapted to determine the matching classification rule via a single pass of the classification structure. In particular, the packet processor is adapted, for each level of the classification structure, starting with the top level and moving towards the bottom level, level-by-level, to compare a value of a packet field having the corresponding priority level to nodes of a logical decision path for the packet within the level of the classification structure to find a matching node. The matching node is a node that has the same value as the packet field. For each non-lowest priority level, if the matching node is found, such a matching node defines the logical decision path to a next level of the classification structure. For the lowest priority level, finding the matching node completes the classification process, where packet processor uses the matching node of the lowest priority level to identify the classification rule matching the packet.

BRIEF DESCRIPTION OF THE DRAWINGS

The teachings of various embodiments can be readily understood by considering the following detailed description in conjunction with the accompanying drawings, in which:

FIG. 2 illustrates a table containing classification rules, according to one embodiment of the present invention;

FIGS. 4A-4G illustrate a flow diagram of a method for constructing a classification structure, according to one embodiment of the present invention;

FIGS. 5A-5B illustrate a method for classifying data packets, according to one embodiment of the present invention.

To facilitate understanding, identical reference numerals have been used, where possible, to designate identical elements that are common to the figures.

DETAILED DESCRIPTION

Figure 1:
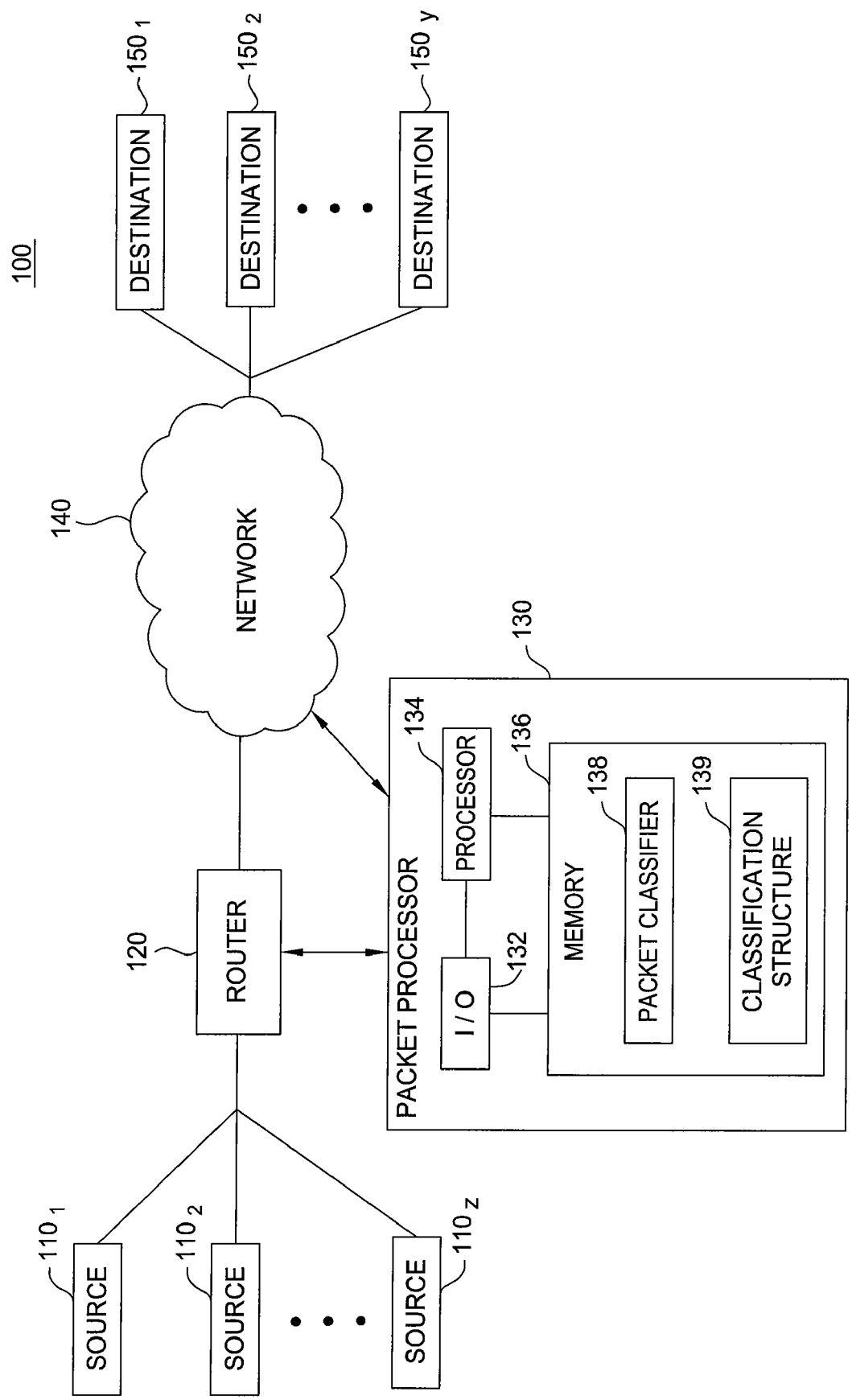
FIG. 1 illustrates a high level diagram of a system for classifying data packets, according to one embodiment of the present invention.

Network components, such as routers, switches, firewalls, terminals, and the like, are often required to examine incoming data traffic in order to determine further actions needed to be performed with the data. In the context of various embodiments of the present invention, data packets, such as Internet Protocol (IP) packets, are classified according to pre-defined classification rules organized into a special classification structure. Each rule defines criteria that are compared against the received packets while an action associated with the rule defines one or more actions to be taken when the rule is applicable (i.e., matches) to a packet. A rule is applicable to a packet when criteria of the rule (i.e., fields' values of the rule) and corresponding values of the packet match.

In the following, reference is made to embodiments of the invention. Note however, that the invention is not limited to any specifically described embodiment. Instead, any combination of the following features and elements, whether related to different embodiments or not, is contemplated to implement and practice the invention. Furthermore, in various embodiments, the invention provides numerous advantages over the prior art. Although embodiments of the invention may achieve advantages over other possible solutions and/or over the prior art, whether or not a particular advantage is achieved by a given embodiment is not limiting of the invention. Thus, the following aspects, features, embodiments, and advantages are merely illustrative and are not considered elements or limitations of the appended claims except where explicitly recited in claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to and from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates a high level diagram of a system 100 for classifying data packets according to one embodiment of the present invention. Specifically, the system 100 comprises multiple source devices (such as a source $110_1$, source $110_2$, and source $110_2$, collectively referred to as sources 110), a router 120, a packet processor 130, a network 140, and multiple destination devices (such as a destination $150_1$, destination $150_2$, and destination $150_y$, collectively referred to as destinations 150). When packets are transmitted between sources 110 and destinations 150 via the network 140, the router 120 may intercepts such packets and provide them to the packet processor 130 for classifying and further processing. In one embodiment, the packet processor 130 collects statistics on packets redirected to the packet processor 130 by either network router 120 or the network 140 and then summarizes the results to a network management system (not shown). The network management system may use such information to configure and manage packet classification rules.

As shown, the packet processor 130 comprises input/output devices 132 (e.g., a monitor, a keyboard, a mouse, a modem, a printer, and the like), a central processing unit (CPU) 134, and memory 136. A packet classifier 138 and a classification structure 139 are placed into the memory 136. Generally, the classification structure 139, such as a ternary search tree, organizes packet classification rules used by the packet classifier 138 to analyze incoming packets and to determine which actions (e.g., drop a packet, re-route the packet, etc.), if any, and to what kind of data packets (e.g., packets having a certain destination address) should be applied. Each rule may include multiple criteria/fields corresponding to various packet fields and be associated with action(s) applicable to matching packets (described below in greater detail). A packet matches a rule when criteria/fields of the rule match values of corresponding fields of the packet. If the packet classifier 138 determines a successful match between a rule and an incoming packet, an action associated with the rule is applied to the packet (e.g., the packet may be quarantined). However, when the packet classifier 138 determines that no successful match exists, a default action is applied instead (e.g., the packet is dropped).

While in FIG. 1, the packet processor 130, packet classifier 138, and classification structure 139 are shown separately from the router 120 or network 140, in one embodiment the packet processor 130, packet classifier 138, and classification structure 139, all or in any combination, are implemented within the router 120, or alternatively, the network 140. In another embodiment, the packet classifier 138 and/or the classification structure 139 are implemented within a network component, (e.g., a switching engine, router, and the like) that receives and conveys network data or within a device communicating with such a network component. The network component may be placed in a data path within a particular network or a data path connecting various networks. Furthermore, the packet classifier 138 and the classification structure 139 are not necessarily collocated and more than one classification structure 139 and/or packet classifier 138 may be used.

FIG. 2 illustrates a table 200 containing classification rules, according to one embodiment of the present invention. In one embodiment, a rule includes two portions, a matching portion for determining whether a rule should be applied to a particular packet and an action portion for defining action(s) to be performed on the packet. The matching portion typically contains multiple fields (criteria) that are compared to corresponding fields of data packets, where complete match between the rule fields and corresponding packet fields indicates that the action portion of the rule should be applied to the packet. The action portion generally defines one or more actions that may be performed on the packet, such as dropping the packet, re-routing the packet, quarantining the packet, re-defining or modifying the packet, transmitting the packet to its destination, and so on.

The table 200 illustrates matching portions of rules 1-4, where each such portion includes three fields, Fields 1, 2, and 3. In one embodiment, order of the fields within a rule defines priority of such fields. For example, for each rule in the table 200, a field of the Field 1 column has higher priority than a field of the Field 2 column, which in turn has higher priority than a field of the Field 3 column. In other words, fields of the Field 1 column are compared to a corresponding field of a data packet before fields of the Field 2 column are compared to a corresponding field of the data packet. Note however, that organizing rules in a table and defining fields' priorities in the above described manner is merely a matter of convenience. For example, the fields of the Field 1 column may have a higher priority than the fields of the Field 3 column, but have a lower priority than the fields of the Field 2 column. Furthermore, organizing rules or their portions as a table, though convenient, is not necessary. For example, rules may be organized as a list.

Each illustrated character, namely "A", "B", "C", and "*", included in the table 200 represents a field value. Generally speaking, each field in a rule represents a field or a subpart of a packet, where each such field/subpart contains packet data representing one of network protocol layers (e.g., a layer of Open System Interconnection (OSI) network protocol, a layer of Transmission Control Protocol/ Internet Protocol (TCP/IP) network, and so on). In one embodiment, rule fields represent one or more of source and/or destination Media Access Control (MAC) address, source and/or destination Ethernet Hardware Address (EHA), source and/or destination IP address, source and/or destination port, protocol ID, User Data Protocol (UDP) port, TCP port, virtual local area network (VLAN) tag, payload type, and other types of data. Typically, such data may be found in headers/footers of packets corresponding to different network protocol layers.

A rule field may contain a specific value, such as a certain MAC address, or a special value, such as a wildcard. Each rule may include multiple fields containing various specific values and/or special values. In FIG. 2, specific values are indicated by letter characters, such as "A", while special values are indicated by symbols, such as "*" (wildcard value). When a rule contains one or more fields having the wildcard value, each corresponding field of an incoming packet may contain any value and the rule would still match the packet if all other fields of the rule and packet match. In other words, whether a particular rule should be applied to packets when the rule contains one or more wildcard fields does not depend on values of packet fields corresponding to the wildcard fields of the rule.

As shown in FIG. 2, classification rules may clash, or in other words, some packets may match more than one rule. For example, in the table 200, rules 1, 2, and 4 may clash. More specifically, if an incoming packet has values of [A, B, C] in its corresponding fields such a packet matches each of the rules 1, 2, and 4. However, an incoming packet having values of [A, B, D] in its corresponding fields matches only rule 2, while a packet having values of [C, B, C] matches only rules 4. Similarly, rules 3 and 4 may clash (e.g., [B, C, C] packet). On the other hand, rules 2 and 3 are mutually exclusive, meaning that no packet exists that could match both these rules simultaneously.

As described below, finding one match is typically sufficient for completing the classification process. Accordingly, using the example described above, if the packet having values of [A, B, C] is classified to match Rule 1, the classification process stops even though the packet could also match rules 2 and 4. In one embodiment, clashing rules are prioritized and the classification structure 139 is organized in such a manner that a matching rule having the highest priority is discovered first. For example in one embodiment, the more specific the rule is the higher priority such a rule has. Thus, in the table 200, rule 1 having no wildcard values would have higher priority than rule 2 having one wildcard value. At the same time, rule 2 having one wildcard value would have higher priority than rule 4 having two wildcard values.

Figure 3A:
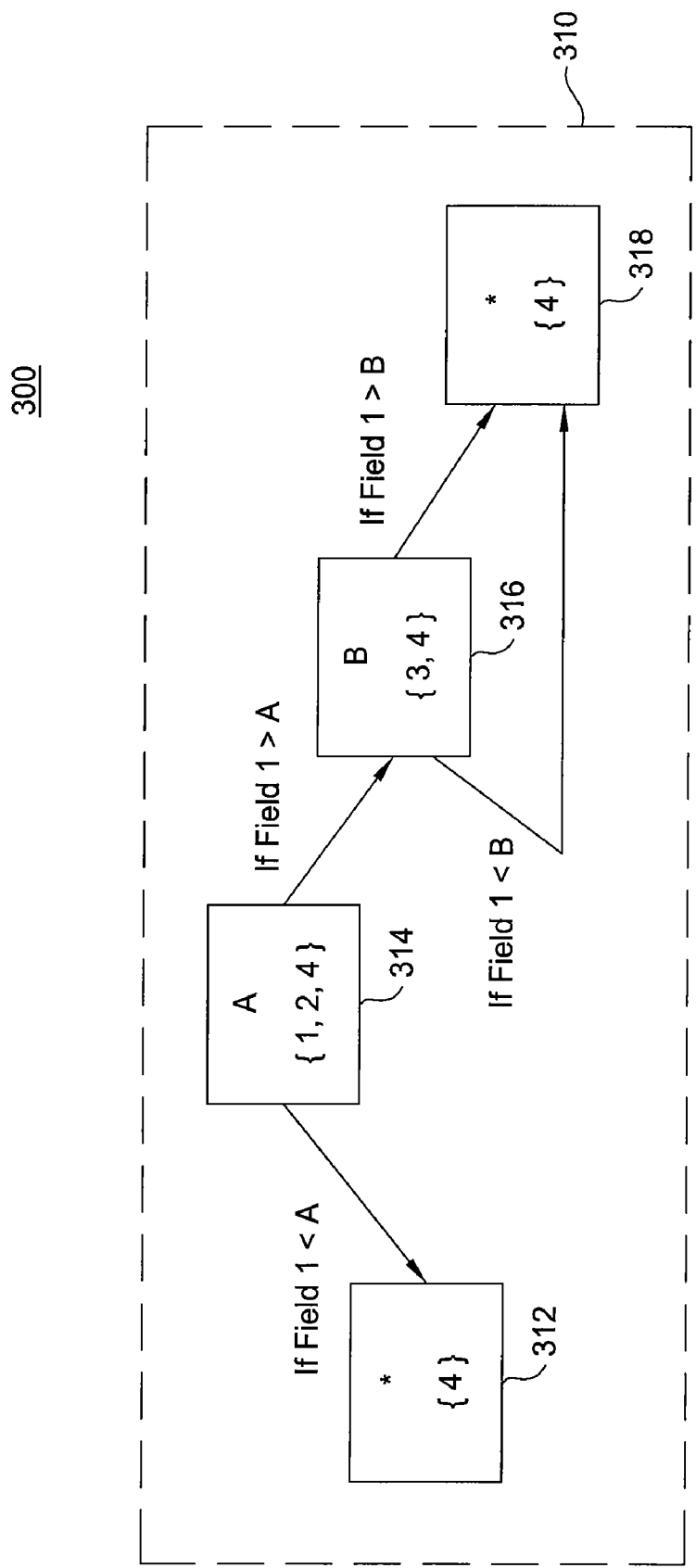
FIGS. 3A-3C illustrate a classification structure and its levels, according to one embodiment of the present invention.
Figure 3B:
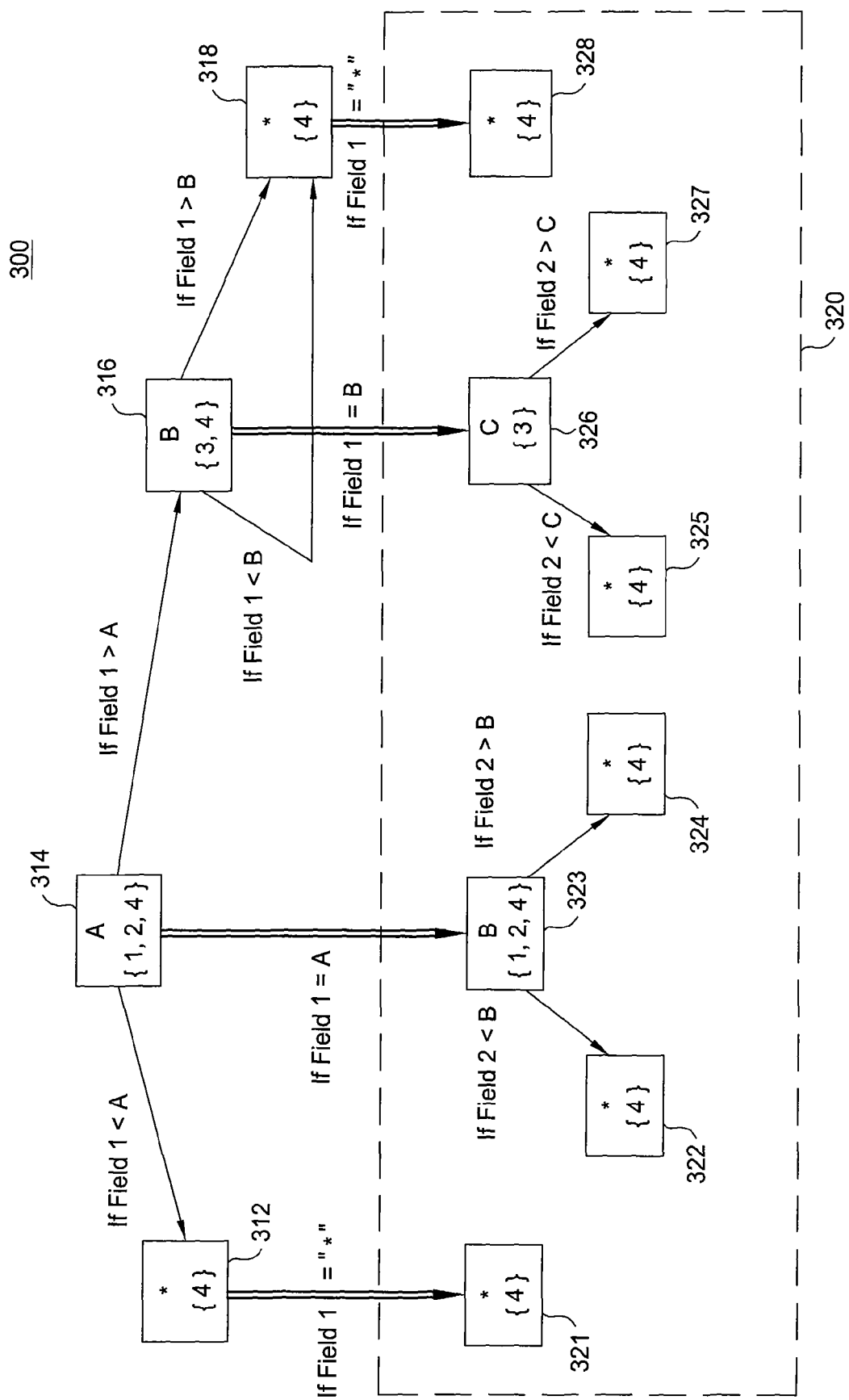
Figure 3C:
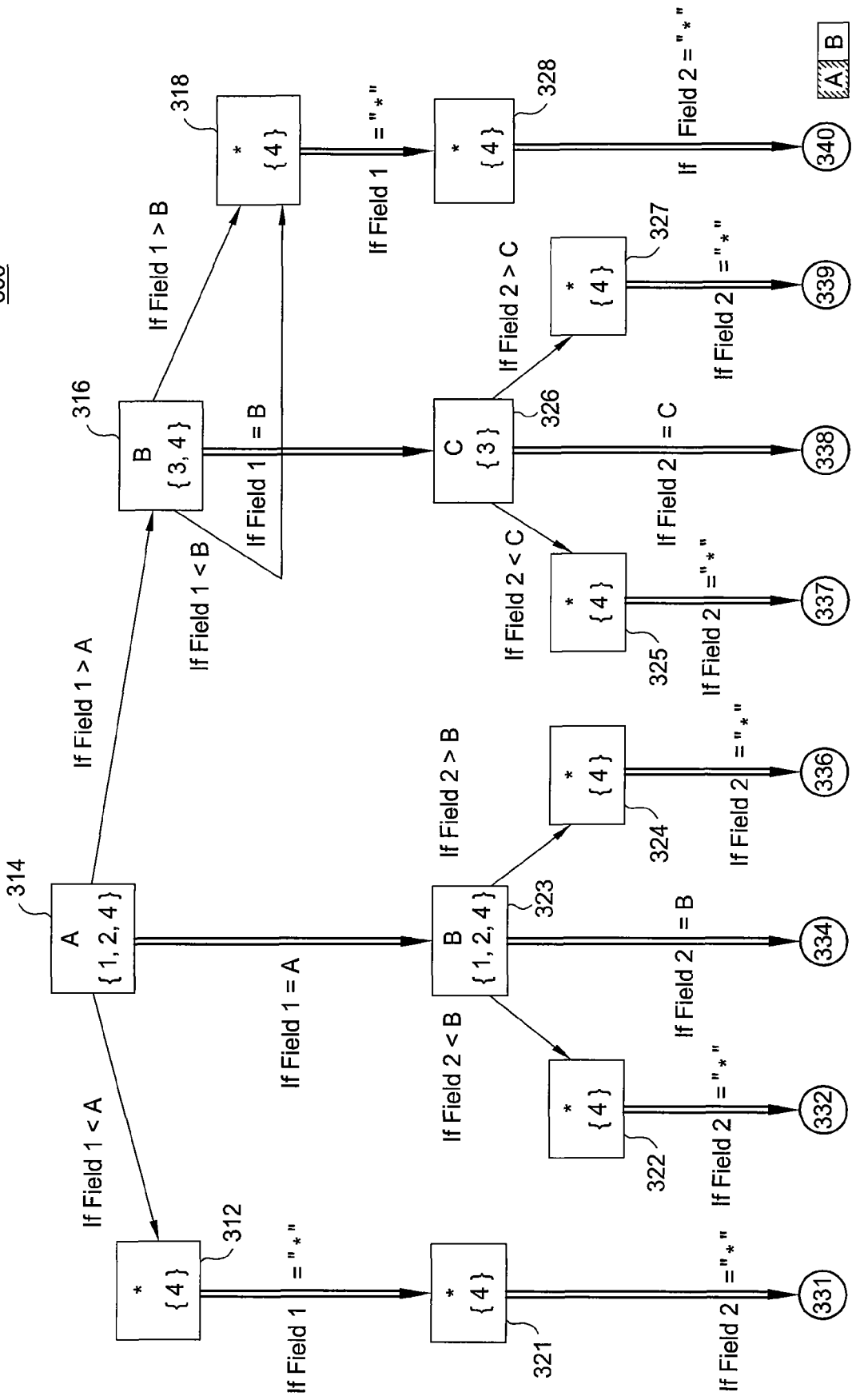
Figure 4A:
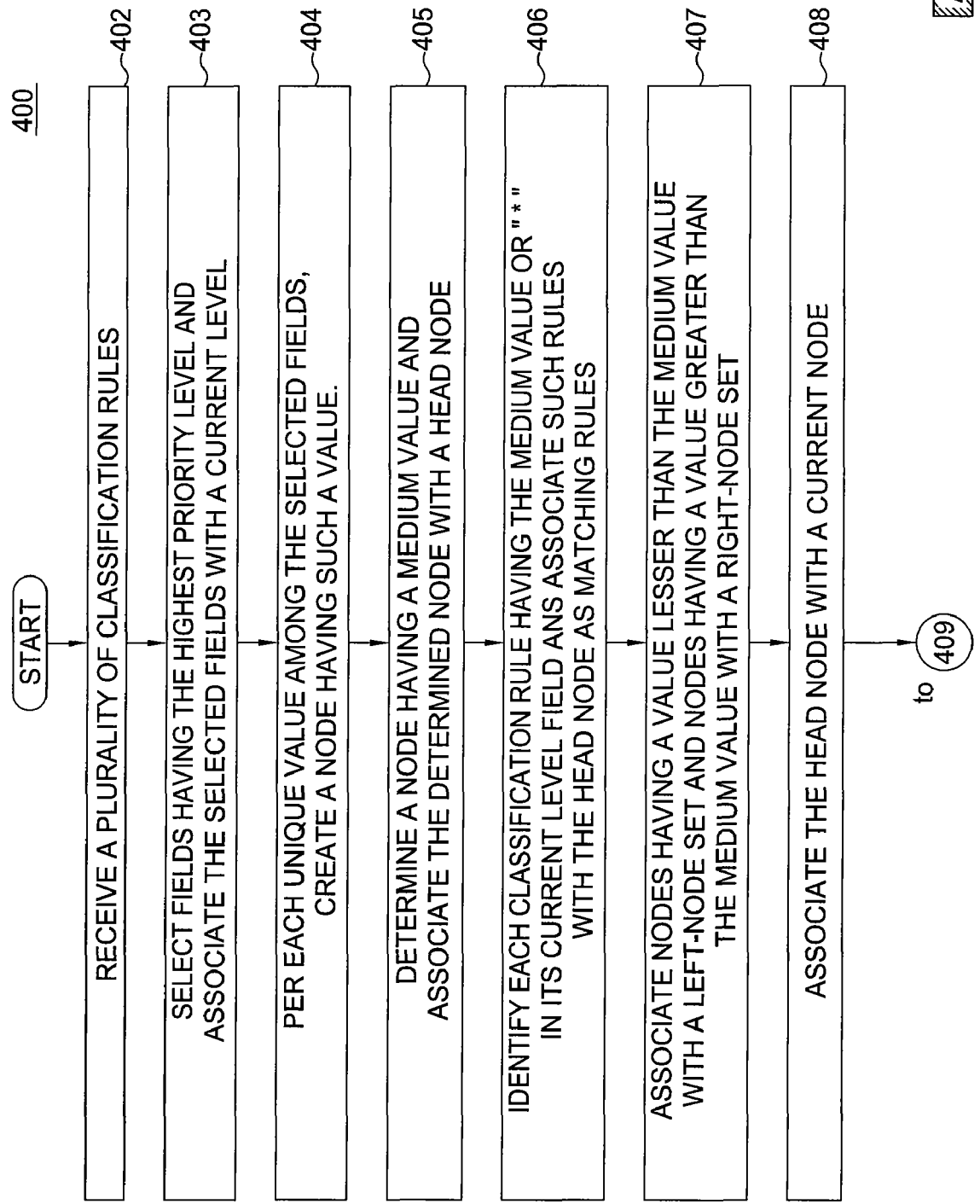
Figure 4B:
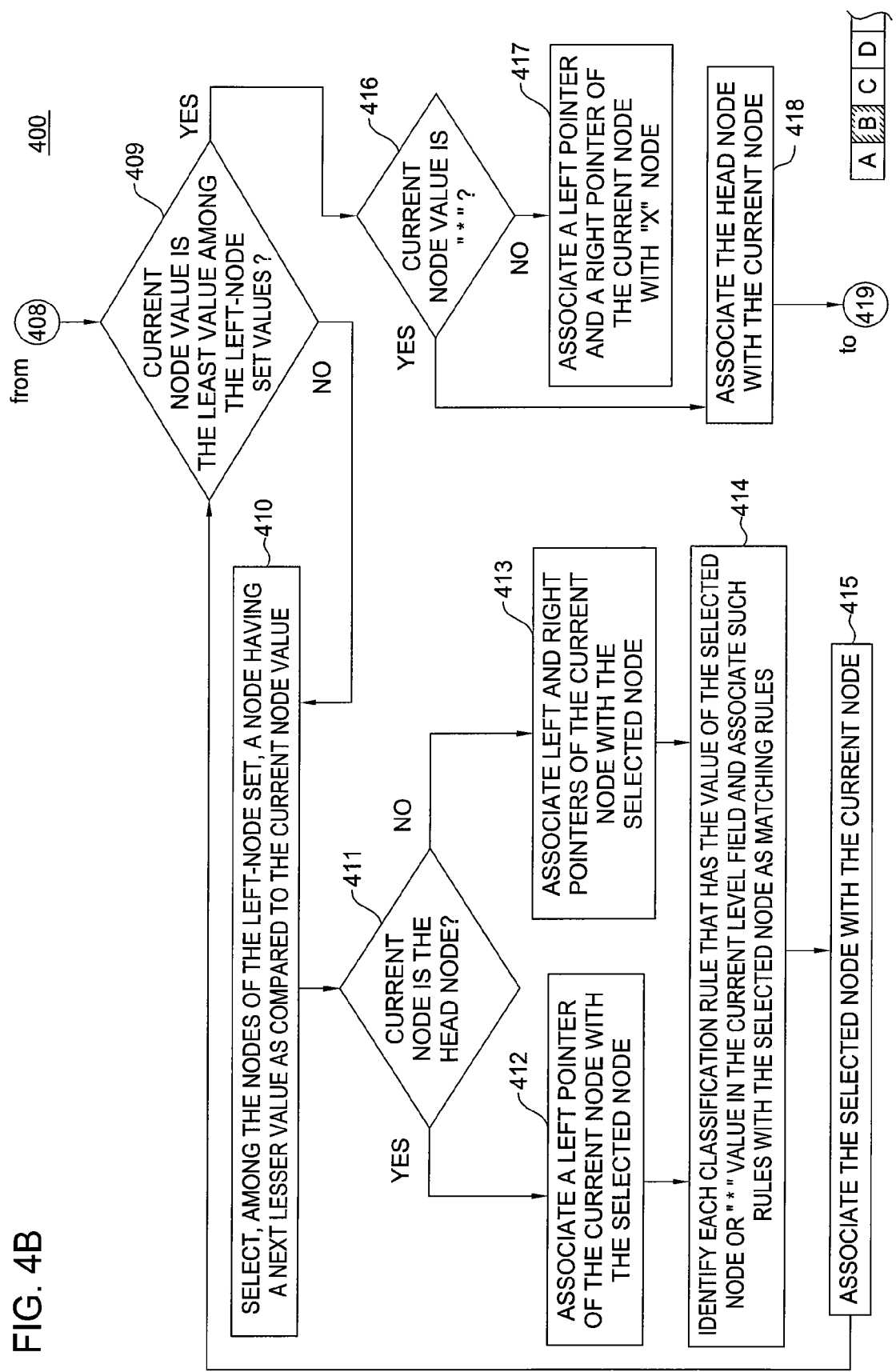
Figure 4C:
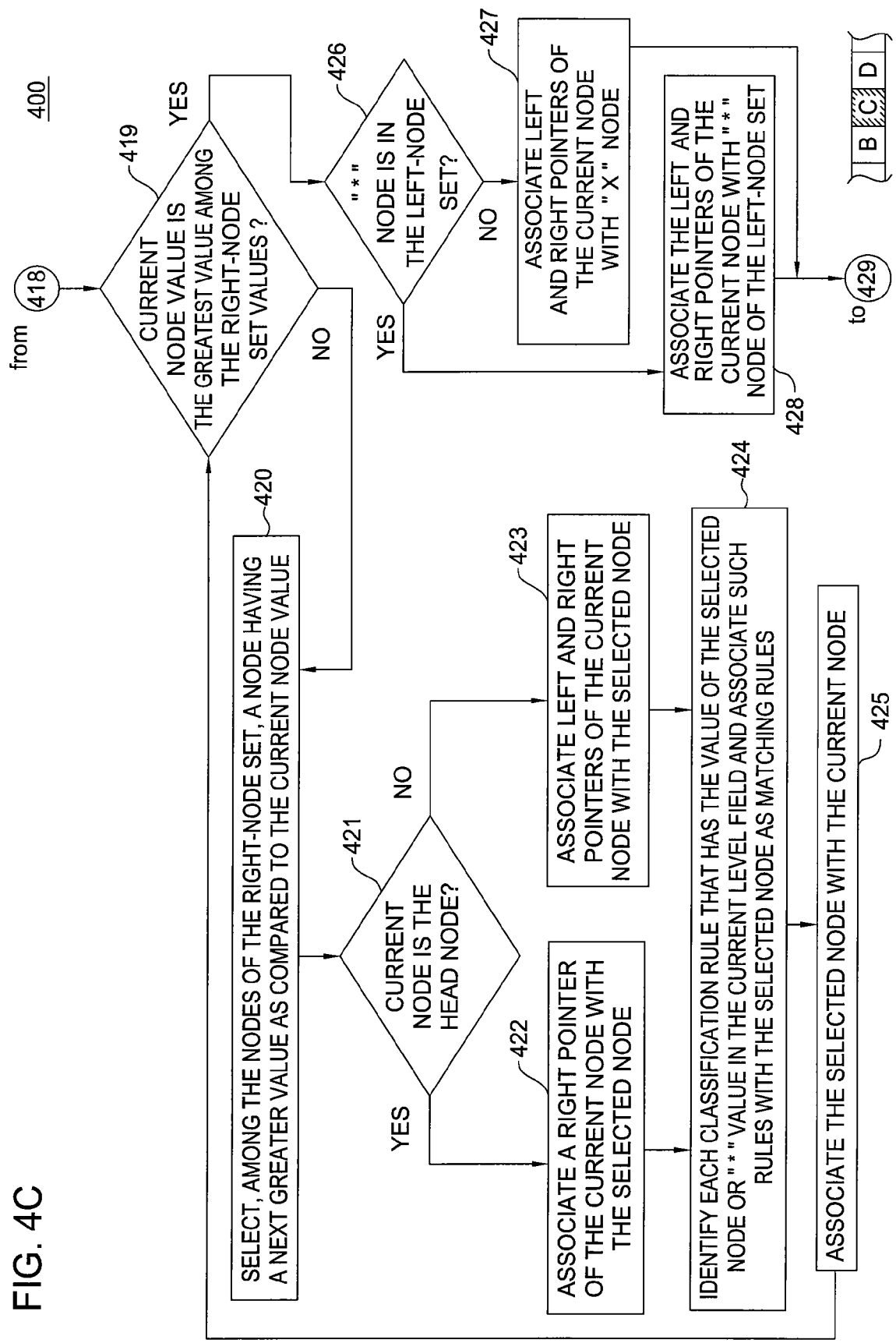
Figure 4D:
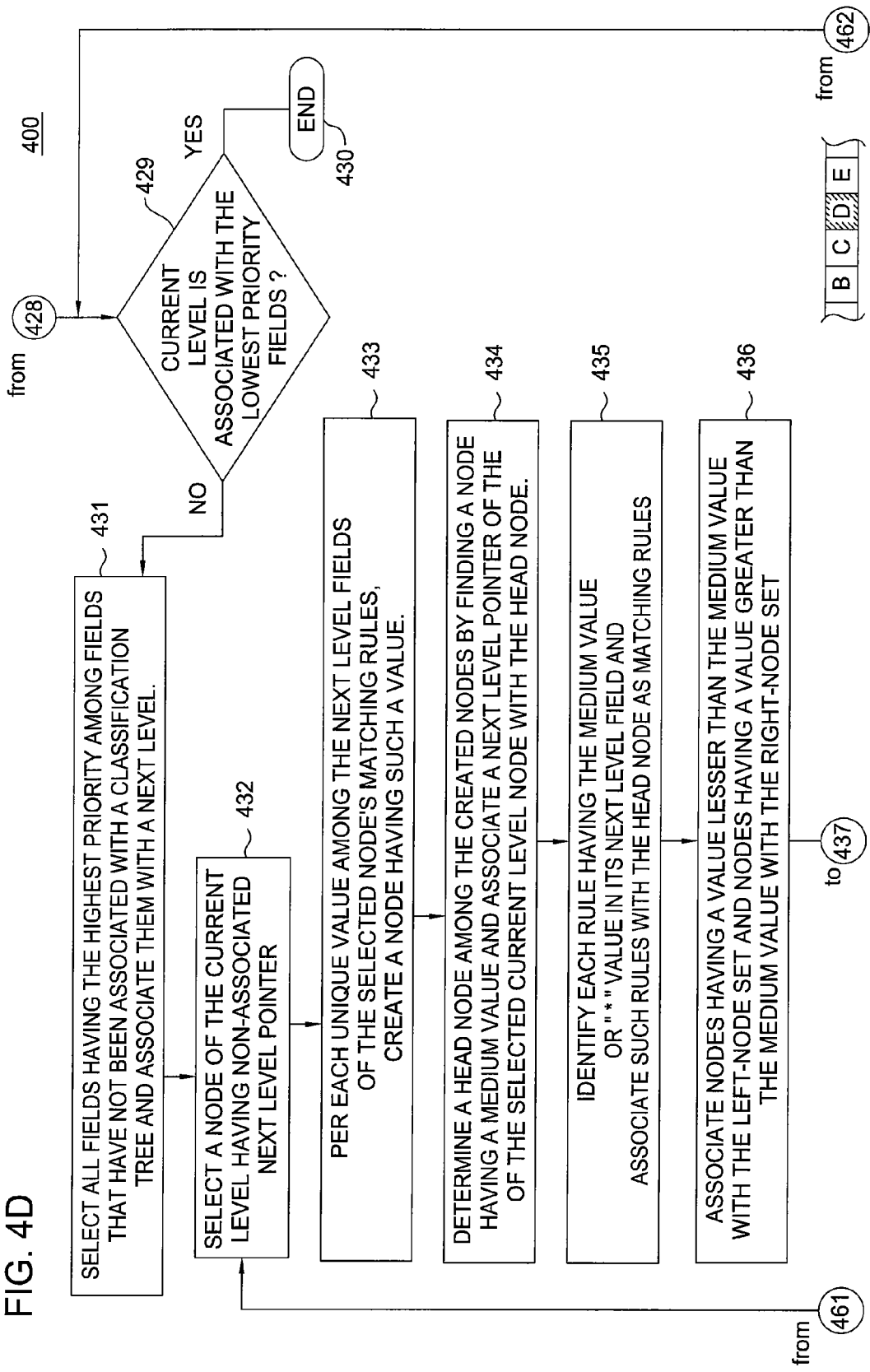
Figure 4F:
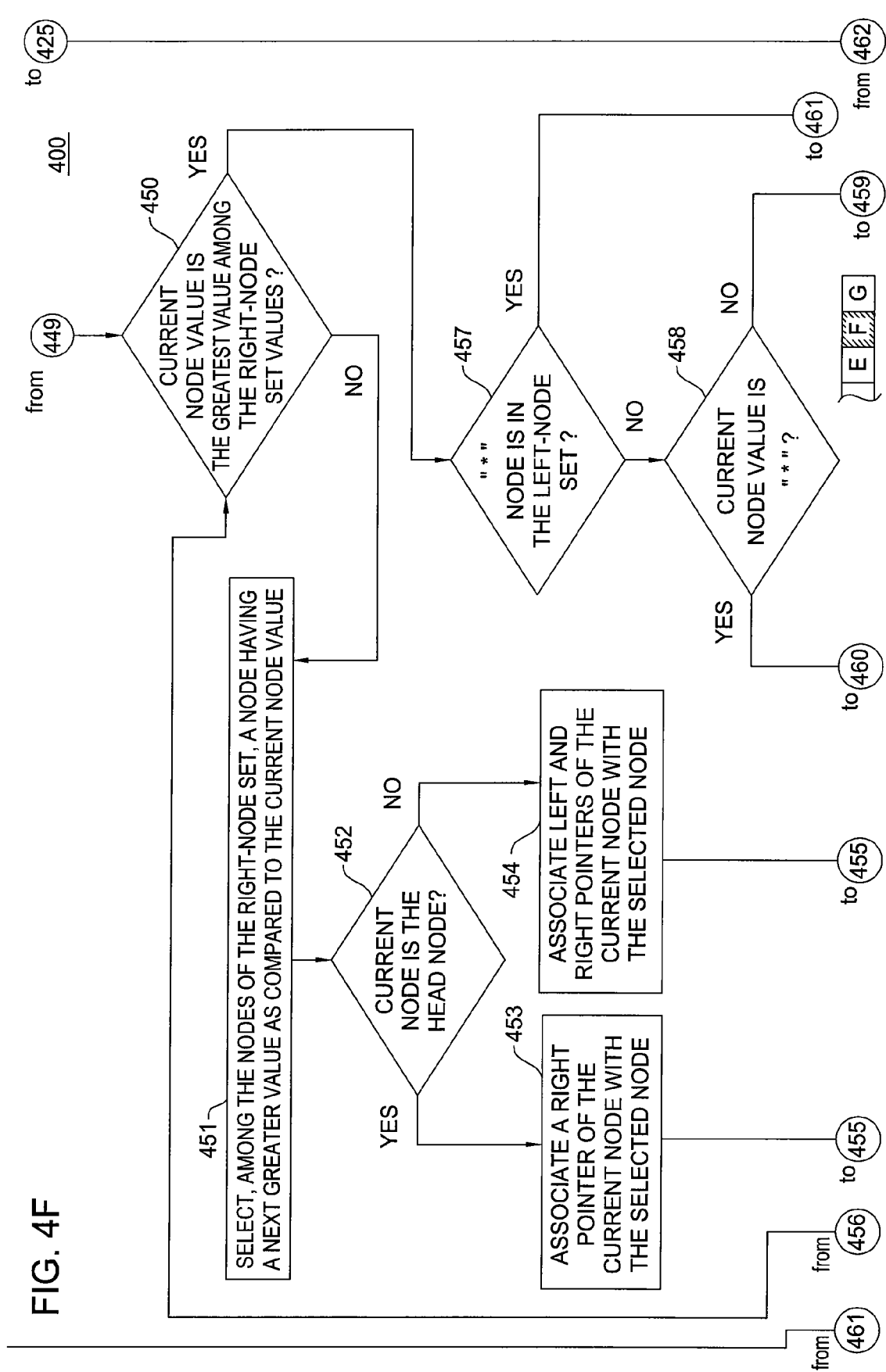

FIGS. 3A-3C illustrate a classification structure 300 and its levels, according to one embodiment of the present invention. As shown, the classification structure 300 organizes the classification rules contained in the table 200 of FIG. 2 (the method for constructing a classification structure is described below in greater detail with respect to FIGS. 4A-4G). Typically, the classification structure 300 is constructed level-by-level, where the higher the level of the classification structure 300 the higher is the priority of the fields it represents. In one embodiment, the classification structure 300 is used by the packet processor 130 to classify incoming packets. The classification process, which is described below in greater detail with respect to FIGS. 5A and 5B, proceeds from one level of the classification structure 300 determining at each level a match or no-match for a corresponding field of the incoming packet. In other words, the classification process of the packet proceeds along a logical decision path within the classification tree corresponding to that packet until either the matching classification rule is found or it is determined that no classification rule matches the packet.

In the illustrative embodiment of FIGS. 3A-3C, the classification structure 300 is a ternary search tree with levels representing columns of the table 200. Generally, a ternary search tree is a search tree where each node may have up to three branches, namely a right branch for values greater than a value of a current node, a middle branch for a value equal to the value of the current node, and a left branch for values lesser than the value of the current node. In one embodiment of the present invention, the middle branch of the classification structure indicates that a successful match at a current level of the tree has been found (i.e., rule (s) applicable to the incoming packet field have been identified) and that the classification process may continue at the next level of the tree (i.e., with the next packet field).

In one embodiment, two additional types of nodes are introduced. First type is unmatched node, i.e., a node indicating a terminal, unsuccessful match (hereinafter, referred as "X" node). In one embodiment, if such a node is reached during the classification process, the classification process is stopped and information indicative that the incoming packet does not fully match any available rules is provided.

Another type is a wildcard node, i.e., a node always indicating a successful match at a current level of the tree (hereinafter, referred as "*" node). In other words, the value of the wildcard node may equal any value it is compared to. The wildcard node value may also be greater or lesser than a value of any other node. In one embodiment, when such a node is reached during the classification process, the classification process continues with the next level of the classification tree 300. If the wildcard node is reached at the lowest level of the classification tree 300, the information indicative of successful match between the incoming packet and a corresponding rule is provided.

FIG. 3A illustrates the highest level of the classification tree 300, i.e., a top level 310. The top level 310 represents the Field 1 column of the table 200. The Field 1 column includes fields having the highest priority fields in their respective classification rules. As illustrated in FIG. 2, Field 1 of the classification rules may include the following values: "A" (rules 1 and 2), "B" (rule 3), and "*" (rule 4). The top level 310 of the classification tree 300 includes one or more nodes for each of these values, i.e., nodes 312 and 318 having value "*", a node 314 having value "A", and a node 316 having value "B."

As shown, the node 314 is a root node of the classification tree 300. Typically, a root node of a classification tree 300 has an approximately medium (middle) value among the values available at the top level of the classification tree 300. Choosing the medium value for the root node value allows constructing a more balanced tree as approximately half of the nodes would have a value lesser the root node value and approximately half of the nodes would have a value greater than the root node value. However, other choices are possible. For example, in one embodiment, the root node is chosen randomly. In another embodiment, the root node is a node having a median value.

As illustrated, the left pointer of the node 314 points to the node 312 having a lesser value (i.e., "*") than the value of the node 314 (i.e., "A"). The right pointer of the node 314 points to the node 316, which value (i.e., "B") is greater than the value of the node 314 (i.e., "A"). Because the wildcard value may be greater or lesser than any value, both the right and the left pointers of the node 316 point to the node 318 having the wildcard value. Note however, that though the right and left pointers of the node 316 point to the single node 318, in one embodiment, the right and left pointers of the node point to two different nodes each having the wildcard value.

Each node also has one or more rules (i.e., matching rules) associated with that node, where the node value matches corresponding field values of each of the associated classification rules. Thus, node 314 is associated with three rules of the table 200, i.e., rules 1, 2, and 4, as rules 1 and 2 have value "A" in their Fields 1 and rule 4 has the wildcard value in its Field 1. Similarly, the nodes 312 and 318 are associated with rule 4 and the node 316 is associated with rules 3 and 4 as rule 3 has value "B" in its Field 1, while rule 4 has the wildcard value in its Field 1. Note however, that while two wildcard nodes are shown in FIG. 3A, i.e., nodes 312 and 318, in one embodiment, the classification structure includes only one wildcard node. In such an embodiment, nodes preceding the wildcard nodes (e.g., the nodes 314 and 316) simply point to the same wildcard node. For example, rather than having node 312 and 318 as two independent nodes, node 312 may be eliminated and node 314 may have its left pointer pointing to the node 318, similar to the left pointer of the node 316.

FIG. 3B illustrates first two levels of the classification tree 300, i.e., the top level 310 and a middle level 320. The middle level 320 represents the Field 2 column of the table 200. The Field 2 column includes fields having a second level of priority in their respective classification rules. As shown in FIG. 2, Field 2 of the classification rules may include the following values: "B" (rules 1 and 2), "C" (rule 3), and "*" (rule 4). Accordingly, the middle level 320 of the classification tree 300 includes one or more nodes for each of these values, i.e., nodes 321, 322, 324, 325, 327, and 328 having value "*", a node 323 having value "B", and a node 326 having value "C."

As mentioned above, the classification process proceeds from one level to another level via one of the middle branches (indicated by the double arrows), such as a branch between the node 312 and the node 321. A middle branch of a node represents a part of a logical decision path that the classification process takes if the node value matches a corresponding field of an incoming packet. For example, if the incoming packet has value "A" in its Field 1, the classification process moves from the top level 310 to the middle level 320 via the branch between the nodes 314 and 323.

Usually, at least some of the classification rules have different values in the same field (e.g., Field 1 of rule 1 has value "A" and Field 1 of rule 3 has value "B"). Consequently, a set of rules that may be considered in relation to an incoming packet at one level represents a subset of rules that may be considered in relation to the incoming packet at the preceding level. More specifically, at the top level, the incoming packet may possibly match any of the all available classification rules. However, because at the top level a highest priority field of the incoming packet has been matched to a value of one of the top level nodes, at the middle level the incoming packet may potentially match only rules that have the same value as the highest priority field of the incoming packet, i.e., the rules associated with the matched top level node. For example, if an incoming packet has value "B" in Field 1, the classification process moves to the middle level 320 via the middle branch between the nodes 316 and 326. Because Field 1 of the packet has value "B", the rules 1 and 2 having value "A" in their Field 1 may not possibly match the incoming packet. Accordingly, the incoming packet is compared only to the rules associated with the node 316, namely rules 3 and 4.

In general, the middle level 320 may be viewed as a plurality of sub-trees or top levels of sub-trees, where the middle level nodes form the top levels of the sub-trees. As shown in FIGS. 3C-A and 3C-B, according to one embodiment, the search sub-trees formed by nodes of the middle and bottom levels are the following: $1^{st}$ sub-tree includes nodes 321, 331, 345; $2^{nd}$ sub-tree includes nodes 322, 323, 324, 332, 333, 334, 335, 336, and 345; 3$^{rd}$ sub-tree includes nodes 325, 325, 327, 337, 338, 339, and 345; and 4$^{th}$ sub-tree includes nodes 328, 340, and 345. For example, the nodes 322, 323, and 324 form a top level of the 2$^{nd}$ sub-tree. Each sub-tree's top level is constructed similarly to the top level 310 using rules associated with a corresponding parent node, instead of all classification rules (i.e., table 200). For example, to construct the 2$^{nd}$ sub-tree's top level, rules associated with the node 314 (i.e., rules 1, 2, and 4) are used.

FIG. 3C illustrates all three levels of the classification tree 300, i.e., the top level 310, the middle level 320, and a bottom level 330. The bottom level 330 represents the Field 3 column of the table 200. The Field 3 column includes fields having a third level of priority in their respective classification rules. As illustrated in FIG. 2, Field 3 of the classification rules may include the following values: "C" (rules 1, 3, and 4) and "*" (rule 2). Accordingly, the bottom level 330 of the classification tree 300 includes one or more nodes for each of these values, i.e., nodes 331, 332, 334, 336, 337, 338, 339, and 340 having value "C" and nodes 333 and 335 having value "*."

In one embodiment, the classification tree 300 may also include "X" nodes 345 (unmatched nodes), i.e., nodes indicating that the incoming packet does not match any of the classification rules. Though in the illustrated classification tree 300 the "X" nodes are present only at the bottom level 330, depending on initial set of classification rules, the "X" node may be present at any level of a classification tree 300. For example, if no classification rule in Table 200 had the wildcard value in its Field 1, the classification tree 300 would have had the "X" node at the top level 310. Further, in one embodiment, only one "X" node is implemented (e.g., one "X" node per the classification structure 300). In such an embodiment, nodes preceding the "X" nodes (e.g., the nodes 331, 336, 340, etc.) point to (or are associated with) the same "X" node. Alternatively, each level of the classification structure may have no more than one "X" node. Note that, the wildcard node may not point to the "X" node because the wildcard node matches any packet field value.

The bottom level 330 is build similarly to the middle level 320. More specifically, similar to the middle level 320, the bottom level 330 may be viewed as a plurality of top levels of sub-trees. Because the bottom level 330 is the last level of the classification tree 300, each such sub-tree contains only a top level, where the bottom level nodes of the classification tree 300 form such top levels. As shown in FIG. 3C-B the search sub-trees are the following: 1$^{st}$ sub-tree includes nodes 331 and 345; 2$^{nd}$ sub-tree includes nodes 332 and 345; 3$^{rd}$ sub-tree includes nodes 333, 334, and 335; 4$^{th}$ sub-tree includes nodes 336 and 345; 5$^{th}$ sub-tree includes nodes 337 and 345; 6$^{th}$ sub-tree includes nodes 338 and 345; 7$^{th}$ sub-tree includes nodes 339 and 345; and 8$^{th}$ sub-tree includes nodes 340 and 345. For example, the nodes 333, 334, and 335 form a top level of the 3sub-tree and the sub-tree itself. Similar to the middle level 320, each top level of the sub-trees is constructed like the top level 310 using rules associated with the corresponding parent nodes, instead of the all classification rules (i.e., table 200). For example, to construct the 3$^{rd}$ sub-tree's top level, rules associated with the node 323 (i.e., rules 1, 2, and 4) are used.

In the above described manner, the classification tree 300 incorporates all the rules of the table 200. For example, rule 1 is represented by nodes 314, 323, and 334; rule 2 is represented by nodes 314, 323, 322, and 324; etc. As described below in greater detail with respect to FIGS. 5A and 5B, such a classification tree is used to classify incoming packets, where the packet fields are analyzed one-by-one, moving from one level of the classification tree to another. In one embodiment, a path within the classification tree leading to a node completing the packet classification process is considered to be a logical decision path where nodes within that path are logical decision points. Accordingly, as described, the classification tree 300 represents a plurality of logical decision paths, where each logical decision path included in the classification tree 300 is necessary for providing single pass classification of an incoming packet based on the classification rules represented by the classification tree 300.

FIGS. 4A through 4G illustrate a flow diagram of a method 400 for constructing a classification structure, such as a classification tree 300, according to one embodiment of the invention. In general, the illustrated method 400 provides for creating a classification tree using a set of classification rules where the created classification tree incorporates each classification rule of the set to provide single pass classification to an incoming packet. To facilitate explanation of the method 400, classification rules of the table 200 and the corresponding classification tree 300 which are illustrated in FIGS. 2 and 3 are used and referred to hereinafter as Example 1.

The method starts with step 402 where a plurality of classification rules is received. As described above, such rules may be organized within a table, such as the table 200 of FIG. 2. Typically, the classification rules are collated, e.g., within a table, on a field-by-field basis, where each field has a priority level. In this manner, when the classification rules are organized in a table with rows representing the classification rules, each column of such a table would include fields having the same priority level.

At step 403, fields of the received classification rules having the highest priority level are selected and associated with a current level. For example, among the classification rules of the table 200, fields of Rules 1-4 found in the Field 1 column would be selected at step 403. In general, the current level represents fields of the classification rules corresponding to one level of the classification tree. For example, while the top level of the classification tree is built, the current level is associated with the fields represented by the top level. At step 404, for each unique value indentified among values of the selected fields, a node of the classification tree is created. In other words, if a field has a unique value a corresponding node is created, while if several fields have the same value, only one corresponding node is created. Thus, in Example 1, three nodes having values of "A", "B", and "*" respectively would be created at step 404. The created nodes form a top level of the classification tree.

Note however, that in FIGS. 3A-3C two wildcard nodes, namely nodes 312 and 318, are shown as included in the top level 310. Alternatively and as defined in the embodiment of FIGS. 4A-4G, only one of the nodes 312 and 318 is created. As could be seen in FIG. 3C, the nodes 312 or 318 have identical corresponding sub-trees: 312→321→331→345 and 318→328→340→345. Accordingly, the top level of the classification tree in the Example 1 being built according to the embodiment of FIGS. 4A-4G may be visualized as the top level 310 in FIG. 3A with the node 318 being removed the left and right pointers of the node 316 pointing to the node 312.

At step 405, a node having a medium value among the created nodes is determined and associated with a head node. In one embodiment, a node has the medium value if approximately half of the nodes have values lesser than the node's value and approximately half of the nodes have values greater the node's value. Thus, in the Example 1 such value is "A." "A" is greater than "*" and lesser than "B", and thus the node 314 having value "A" is the head node. However, in another embodiment, the medium value is defined in such a manner, that value "B", not value "A" would be determined as the medium value ("B" is greater than A and lesser than "*"). In yet another embodiment, a random node is selected at step 405.

At step 406, one or more matching rules associated with the head node are identified. A matching rule is a classification rule that has the head node value (i.e. the medium value) or the wildcard value (i.e., "*") in its current level field. In the Example 1, matching rules associated with the head node 314 are Rules 1, 2, and 4, because Rules 1 and 2 have "A" value in the current level field, Field 1, and rule 4 has "*" value in the current level field, Field 1.

To create left and right branches of the head node, a left-node and right node sets are created at step 407. The left-node set includes nodes which values are lesser than the medium value (e.g., in the Example 1, the left-node set would include node 312, having "*" value, which is lesser than the medium value "A"). The right-node set includes nodes having values greater than the medium value (e.g., in the Example 1, the right-node set would include node 316, having "B" value, which is greater than the medium value "A", and optionally another "*" node, the node 318). At step 408, the head node is associated with a current node. In general, the current node is a node, which left and/or right branches are currently being determined. In other words, the current node allows the method 400 to move about the nodes of the classification tree to define relations between the nodes.

Steps 409 through 417 provide for identifying a left branch of the head node based on the nodes of the left-node set. Generally speaking, in the illustrative embodiment of FIGS. 4A-4G, the nodes of the left-node set form the left branch of the head node in order of decreasing node values starting with a node having the greatest value among the nodes in the left-node set. At step 409, it is determined whether a node associated with the current node has the least value among the left-node set values. If yes, then all the created nodes of the left-node set have been analyzed and relations between the nodes of the left branch have been defined, and thus, the method 400 proceeds to step 416.

When the current node value is not the least value among the nodes of the left-node set (step 409), then not all relations between the nodes of the left branch have been defined. Accordingly, at step 410, a node having a next lesser value as compared to the current node value is selected among the nodes of the left-node set. For example, if the left-node set includes nodes [A, B, C] and the current node value is C, then a node having value B selected would be at step 410. However, if the current node value is B, then the selected node value is A.

If at step 411, it is determined that the current node is not a head node, then, at step 413, left and right pointers of the current node are associated with selected node. However, if the current node is the head node then, at step 412, only the left pointer of the current node is associated with selected node. At step 414, matching rules for the selected node are identified. More specifically, the classification rules that have in the current level field the same value as the selected node or the wildcard value are identified and associated with the selected node as the matching rules. At step 415, the selected node is associated with the current node and the method returns to step 409. In this manner the method 400 moves along nodes of the left branch in order of the decreasing node values until relations between all nodes of the left branch are defined.

At step 416, it is determined whether the current node value is the wildcard value (i.e., "*"). If not, there are no wildcard fields at the current level, and thus, an incoming packet having a current level value that does not match any top level node values may exist. Accordingly, at step 417, a special "X" node is added to the left branch, such as node 345 in FIG. 3C. More specifically, right and left pointers of the current node are associated with (point to) the "X" node. As discussed above, in one embodiment, such the "X" node indicates that no matching rule could be found for an incoming packet and the classification process should be stopped.

However, when the current node value is the wildcard value then no "X" node is added to the left branch, because any incoming packet would match the current node and the classification process would simply proceed to the next tree level. Typically, a classification tree level that includes a wildcard node does not have the "X" node, and vice versa. Furthermore, a wildcard node usually does not have a left or right branch.

At step 418, the head node is associated with the current node to allow for building the right branch of the head node. Steps 418 through 428 provide for identifying a right branch of the head node based on the nodes of the right-node set in a manner similar to steps 409 through 417. Generally speaking, in the illustrative embodiment of FIGS. 4A-4G, the nodes of the right-node set form the right branch of the head node in order of increasing node values starting with a node having the least value among nodes of the right node set. At step 419, it is determined whether a node associated with the current node has the greatest value among the right-node set values. If yes, then all the created nodes of the right-node set have been analyzed and relations between the nodes of the right branch have been defined, and thus, the method 400 proceeds to step 416.

When the current node value is not the greatest value among the nodes of the right-node set (step 419), then not all relations between the nodes of the right branch have been defined. Accordingly, at step 420, a node having a next greater value as compared to the current node value is selected among the nodes of the right-node set. For example, if the right-node set includes nodes [A, B, C] and the current node value is A, then a node having value B selected would be at step 420. However, if the current node value is B, then the selected node value is C.

If at step 421, it is determined that the current node is not a head node, then, at step 423, left and right pointers of the current node are associated with selected node. However, if the current node is the head node then, at step 422, only the right pointer of the current node is associated with selected node. At step 424, matching rules for the selected node are identified. More specifically, classification rules having in the current level field the wildcard value or the same value as the selected node are identified and associated with the selected node as the matching rules. At step 425, the selected node is associated with the current node and the method returns to step 419. In this manner the method 400 moves along nodes of the right branch in order of the increasing node values until relations between all nodes of the right branch are defined.

At step 426, it is determined whether the left-node set includes the wildcard node. If not, then there are no wildcard fields at the current level, and thus, an incoming packet having a current level value that does not match any top level node values may exist. Accordingly, at step 427, right and left pointers of the current node are associated with the "X" node. However, when the left-node set includes the wildcard node, then no "X" node is added to the left branch, because any incoming packet may be matched to such a node. Whether the classification process takes a logical decision path along the left branch or along the right branch, if at least one classification rule has the wildcard value in the current level field, a corresponding field of an incoming packet should be matched to the wildcard field, unless a specific value match has been already found. Accordingly, at step 428, the left and right pointers of the current node are associated with the wildcard node of the left-node set.

Generally, the above described steps 403 through 428 of the method 400 provide for building the top level of the classification tree. Steps 429 through 462 provide for building of the remaining levels of the classification tree and defining relations between the levels of the classification tree to complete the construction of the classification tree. At step 429, it is determined whether the current level is associated with the lowest priority level fields. In other words, step 429 determines whether all levels of the classification tree have been built. If not, at step 431 fields representing a next level of the classification tree are selected. More specifically, fields of the classification rules having the highest priority level among fields that have not been yet represented in the classification tree are selected and associated with the next level. In the Example 1 such fields are found in the Field 2 column of the table 200. Generally, the next level represents fields of the classification rules that are represented by a single level of the classification tree, namely by children of the current level nodes.

In general, through the repeated steps 432-434, relations between current level nodes and next level nodes are defined. More specifically, at step 432, a current level node having a next level pointer (i.e., pointer indicating the middle branch of the node), which has not been yet associated with any nodes, is selected. In one embodiment, such a selection is random; while in another embodiment, the current level nodes are selected one-by-one in order of their values.

At step 433, a pool of next level nodes is created, where a node in the pool may be reached during the classification process only after the selected current level node has been matched. In general, the created pool includes nodes of a top level of a classification sub-tree associated with the selected current level node via the node's middle branch. More specifically, per each unique value among the next level fields of the selected node's matching rules, a node having such a value is created. In other words, the created pool of nodes represents a subset of the next level fields of the classification rules, where the selected current level node serves as a limiting condition. At step 434, a head node among the created nodes is determined. In the illustrated embodiment, the head node is the node that has the medium value among the created nodes values. The determined head node is associated with the next level pointer of the selected current level node.

Steps 435 through 460 are similar to the above described steps 406 through 428 with slight variations. In general, these steps provide for building the top level of classification sub-trees where the determined head node is the root node of each of such sub-trees. Accordingly, at step 435, one or more matching rules associated with the determined head node are identified, where a matching rule is a classification rule that has the medium value or the wildcard value (i.e., "*") in its current level field. However, unlike step 406 where the matching rules are selected from all available classification rules, at step 435 the matching rules for the next level head node are determined using a set of the classification rules that includes only matching rules of the head node's parent node (e.g., the selected current level node).

To create left and right branches of the next level head node, a left-node and right node sets are created at step 436, where the left-node set includes nodes which values are lesser than the medium value and the right-node set includes nodes having values greater than the medium value. At step 437, the next level head node is associated with the current node.

Similar to steps 409 through 417, steps 438 through 444 provide for identifying a left branch of the next level head node based on the nodes of the left-node set. At step 438, it is determined whether a node associated with the current node has the least value among the left-node set values. If yes, then all the created nodes of the left-node set have been analyzed and relations between the nodes of the left branch have been defined, and thus, the method 400 proceeds to step 457.

When the current node value is not the least value among the nodes of the left-node set (step 438), then not all relations between the nodes of the left branch have been defined. Accordingly, at step 439, a node having a next lesser value as compared to the current node value is selected among the nodes of the left-node set. If at step 440, it is determined that the current node is not a head node, then, at step 442, left and right pointers of the current node are associated with selected node. However, if the current node is the head node then, at step 441, only the left pointer of the current node is associated with selected node. At step 443, matching rules for the selected node are identified. More specifically, classification rules among the matching rules of the selected current level node that have in the next level field the same value as the selected node or the wildcard value are identified and associated with the selected node as the matching rules. At step 444, the selected node is associated with the current node and the method returns to step 439.

When the last node of the left branch is reached, the current node is the last node of the left branch and its value is the least value of the left-node set. At step 445, it is determined whether the current node value is the wildcard value (i.e., "*"). If not, there are no wildcard fields at the next level among the classification rules used to build the classification sub-tree, and thus, an incoming packet having a next level value that does not match any sub-tree's top level node values may exist. Note however, that this does not prevent existence of a classification rule among the initial set of the classification rules that has the wildcard value in the next level field.

The current node may also have the least value of the left-node set when the only node in the left-node set is the head node. Typically, as the classification tree being built, a number of classification rules used to build the classification sub-trees decreases at each next level of the classification tree. Consequently, number of different field values at each level decreases as well. Therefore, eventually, a left-node set and/or right node set would include only one node—a head node. Accordingly, at step 446 it is determined whether the current node is the head node. If yes, then the head node is the only node in the left-node set, and thus, at step 448 its left pointer is associated with the special "X" node. If not, then at step 447, both the left and right pointers of the current node are associated with the "X" node.

At step 449, the head node is associated with the current node to allow for creating of the right branch of the head node. Similar to steps 418 through 428, steps 450 through 460 provide for identifying a right branch of the next level head node based on the nodes of the right-node set. More specifically, at step 450, it is determined whether a node associated with the current node has the greatest value among the right-node set values. If yes, then all the created nodes of the right-node set have been analyzed and relations between the nodes of the right branch have been defined, and thus, the method 400 proceeds to step 457.

When the current node value is not the greatest value among the nodes of the right-node set (step 450), then not all relations between the nodes of the right branch have been defined. Accordingly, at step 451, a node having a next greater value as compared to the current node value is selected among the nodes of the right-node set. If at step 452, it is determined that the current node is not a head node then, at step 454, left and right pointers of the current node are associated with selected node. However, if the current node is the head node then, at step 453, only the right pointer of the current node is associated with selected node. At step 455, matching rules for the selected node are identified. More specifically, the classification rules that in the next level field have the same value as the selected node or the wildcard value are identified and associated with the selected node as the matching rules.

At step 456, the selected node is associated with the current node and the method returns to step 450. In this manner the method 400 moves along the nodes of the right branch in order of the increasing node values until relations between all the nodes of the right branch are defined. If the current node value is the greatest value among the nodes of the right-node set, then the method proceeds to step 457. This may happen when either the last node of the right-node branch has been reached or when the only node in the right-node set is the head node. When the only node in the right-node and left-node sets is the head node and its value is the wildcard value, it is not necessary to associate the right and left pointers of the head node with any nodes because there is only one value to compare with the corresponding field of the incoming packet and this value matches any value. Accordingly, in one embodiment at step 457, it is determined whether the current node value is the wildcard value, and if yes, the method simply proceeds with defining relations between the current and next levels nodes.

When the current node value is not the wildcard value, at step 457, it is determined whether the left-node set includes the wildcard node. When the left-node set includes the wildcard node, then no "X" node is added to the right branch, but instead, at step 460, the left and right pointers of the current node are associated with the wildcard node of the left-node set. When the left-node set does not include the wildcard node, the right and left pointers of the current node, at step 459, are associated with the "X" node, if not associated previously (e.g., when the left-node set includes only the head node, the head not pointer may have been already associated with the "X" node during processing of the left branch).

At step 461, it is determined whether relations between each node of the current level and nodes of the next level have been defined. When at least one node of the current level has a next level pointer not associated with a next level node, the method 400 returns to step 432. In this manner, steps 432 through 461 repeat until each node of the current level is associated with a next level node. Then, at step 462, the next level fields are associated with the current level and the method 400 returns to step 429 to process a next level of the classification tree. In other words, at step 462 the next level becomes the current level.

If at step 429, it is determined that the current level is associated with the lowest priority level fields, then all fields of the classification rules have been analyzed and represented in the classification tree by corresponding levels. Accordingly, the method 400 ends at step 430. In this manner, a classification tree having multiple decision paths is constructed. As discussed above, in one embodiment, the constructed classification tree includes only those logical decision paths that are necessary for providing a single pass classification of an incoming packet.

Note however, that for the same set of classification rules, multiple variations of how the classification tree is constructed are possible. For example, as described above, head node's left and right branches are built using ordered sets of nodes, thus effectively creating branches where at the current level for each node, left and right pointers are associated with the same node. In another embodiment, instead of selecting a next lesser/greater node as, for example, described in steps 410 and 420, a node having a medium value among the unanalyzed nodes left is chosen. In this manner, some nodes' left and right pointers would be associated with different nodes. Further, paths (logical decision paths) that the classification process would take at each level typically will be shorter than in the above described classification tree. However, for example, a number of pointers to the wildcard nodes and/or the "X" node may increase significantly. Note further, that though in the description above relations between the nodes are defined using pointers, other tools may be used, e.g., identifying nodes as a parent or a child (e.g., left child, middle child, right child) and associations between particular nodes.

Figure 5A:
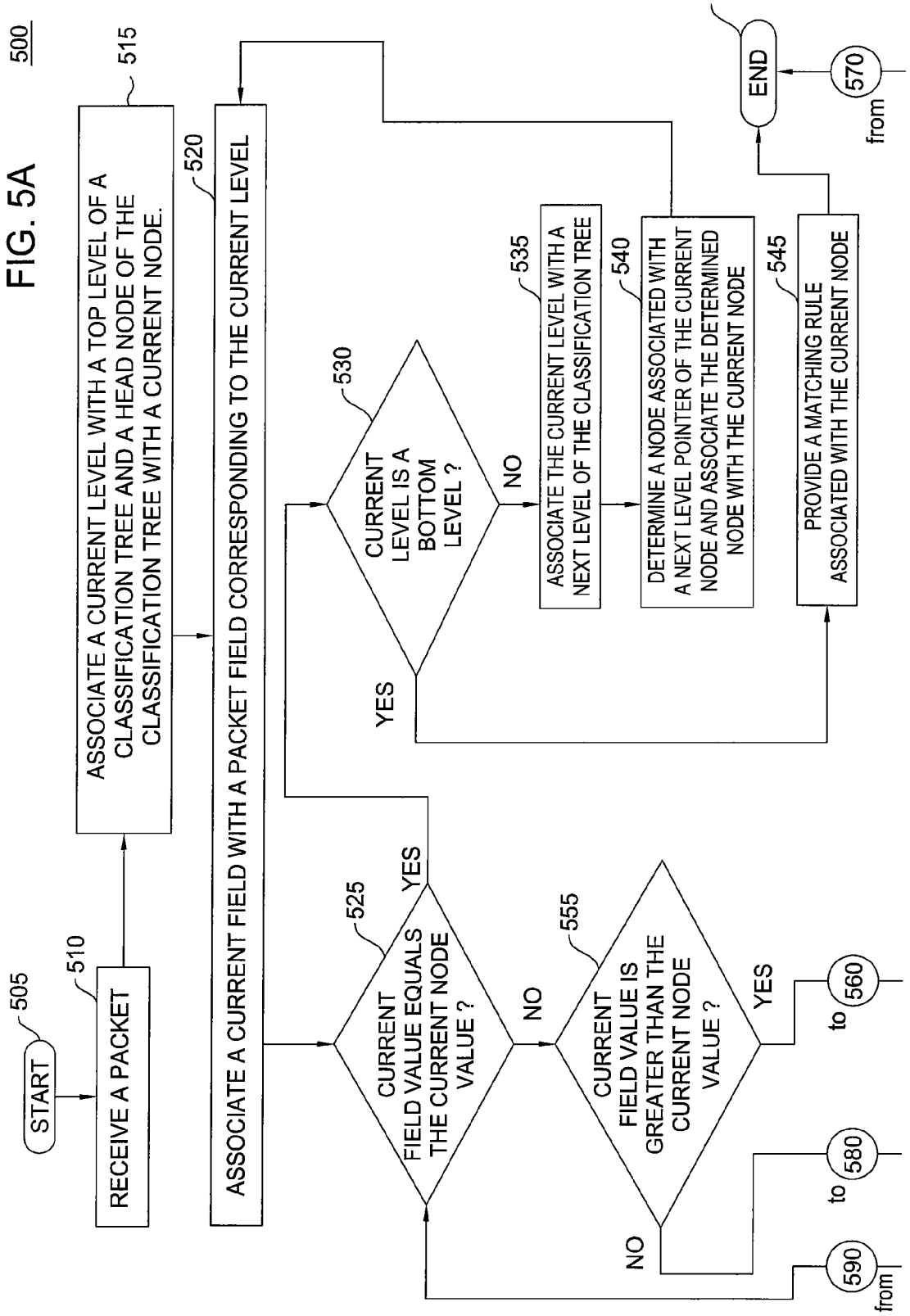

FIGS. 5A and 5B illustrate a method 500 for classifying packets, according to one embodiment of the invention. The illustrated method 500 uses a classification structure, such as the classification tree 300 described above regarding FIGS. 3A-3C. The method 500 starts at step 505. At step 510 a packet is received. At step 515 two variables, i.e., a current level and a current node are assigned initial values. For example, in one embodiment such values are a top level (e.g., the top level 310 in FIGS. 3A-3C) and a head node (e.g., the node 314) of the classification tree respectively. In general, the current level represents a level (e.g., the top level 310, the middle level 320, or the bottom level 330) of the classification tree that is currently analyzed according to the method 500. The current node represents a node (e.g., the nodes 312, 326, 336, etc.) of the classification tree that is currently analyzed according to the method 500.

At step 520 a current field is associated with a packet field corresponding to the current level. As described above, levels of the classification tree 300 correspond to priority levels of the classification rules' fields. The current field represents a value of a packet field having a priority level corresponding to the currently analyzed tree level. For example, if the packet's fields have values of [B, C, A] where B is a value of a field having the highest priority and A is a value of a field having the lowest priority (Example 2) and the method 500 is at a stage of analyzing the second level of the classification tree (e.g., the middle level 320) then the current field would have value "B."

At steps 525 and 555, the current field value is compared to the current node value to determine which branch of the current node (left, middle, or right), or in other words, which logical decision path, should be taken to proceed with the classification process. Unless the current field value equals the current node value, the method 500 proceeds to step 555. Step 555 provides for determining whether the current field value is greater or lesser then the current node value. Due to the underlying structure of the classification tree of this embodiment, if the current field value is lesser than the current node value, a matching node, if it exists, is located somewhere along the left branch of the current node. Accordingly, the method 500 proceeds to step 580, where a node associated with a left pointer of the current node is identified (i.e., a left child). Conversely, if the current field value is greater than the current node value, a matching node, if it exists, is located somewhere along the right branch of the current node. Accordingly, the method 500 proceeds to step 560, where a node associated with a right pointer of the current node is identified (i.e., a right child).

Consider the above described Example 2. To analyze the top level 310, and the node 314 in particular, in relation to the received packet [B, C, A], the value of the node 314, i.e. "A"

is compared with the current field value, i.e., "B." Because "B" is greater than "A", the classification process will move along the right branch of the node 314 to the node 316, which value in turn will be compared to the current field value, as described below in greater detail.

In one embodiment, not every incoming packet would have a matching classification rule. In such an embodiment, the classification tree may include a special "X" node, which, if reached during the classification process of a particular packet, would indicate that the incoming packet does not match any classification rules represented in the classification tree, and thus, the classification process may be stopped. Accordingly, the method 500 of FIG. 5 includes step 565, where it is determined whether a node identified at steps 560 or 580 is the "X" node. If yes, at step 570, no-match data is provided to a component responsible for applying the rule and the method 500 ends at step 550.

In one embodiment, the no-match data simply indicates that the incoming packet does not match any of the classification rules represented in the classification tree. In another embodiment, additional information is provided. For example, such information may include a list of partially matching rules, a list of fields of the received packet that have been matched, a level of the classification tree at which the "X" node has been reached, and the like.

Consider the following example, Example 3. Let assume that the incoming packet's fields have values of [D, C, A], where D is a value of a field having the highest priority and A is a value of a field having the lowest priority. Applying the method 500, the first two fields of the packet are successfully matched, i.e., "D" with the node 318, and "C" with the node 328. However, no successful match may be found for the last field of the packet, i.e., "A." The node 340, the only node that is available for analysis on the bottom level 330 in this particular example, has value "C." As "A" is lesser than "C" (step 555), a node associated with the left pointer of the node 340 is determined at step 580, i.e., the node 345. The node 345 is the "X" node (step 565), and thus no-match data is provided (step 570). Such data may include information that the first two packet fields' values "D" and "C" match rule 4 (e.g., a rule associated with the last matched node, the node 328); that the no-match has been determined at the bottom level 330 of the classification tree; and the like.

Returning to step 565, if at this step it is determined that the node identified at steps 560 or 580 is not the "X" node, at step 590, the identified node becomes the current node and the method 500 returns to step 525. In this manner, the classification process of the method 500 proceeds from one node to another, where the nodes are of same level (or in other words, along a logical decision path formed within one level of the classification tree) until either a matching node of the current level is found at step 525 or the "X" node 565 is reached. Thus, in the above described example 1, when the top level 320 and the first packet field are analyzed, initially the current node variable equals the head node 314. Because the first packet field's value "B" is greater than the value of the node 314, the current node variable is assigned a new value, namely the node 316, which is the right child of the node 314. This assignment allows for comparing between the value of the packet first field and the value of the node 316, and thus, matching the first packet field to the node 316.

If at step 525 it is determined that the current field value equals the current node value (i.e., match), the method 500 proceeds to step 530. This means that one of the packet fields has been matched with at least one of the classification rules. Accordingly, the classification process continues along logical decision path formed by the middle branch of the current node to the next level of the classification tree. Thus, in the Example 2 above, such match would be found between value "B" of the first packet's field and the node 316 and value "C" of the second packet's field and the node 326.

At step 530, it is determined whether the current node is a node of the bottom level (e.g., the bottom level 330). If the current level is the bottom level then each level of the classification tree has been considered. In other words, because the bottom level node matches the lowest priority field of the received packet, the packet has been classified and a matching rule has been found. The matching rule is the rule associated with the current node. At step 545, such a rule is provided to a component responsible for applying the rule and the method 500 ends at step 550.

For example, consider a packet having fields' values of [A, B, C] where A is a value of a field having the highest priority and B is a value of a field having the lowest priority (example 3). Consider further, that the method 500 is currently at a stage of analyzing the bottom level 330 and the node 334. Accordingly, the current level represents the bottom level 330 and the current node represents the node 334. Therefore, the current node' value (i.e., "C") equals the current field' value (i.e., "C") because the third field of the packet is the field that corresponds to the bottom level. Further, because the current level is the bottom level, all fields of the packet have been matched, i.e., "A" and the node 314, "B" and the node 323, and "C" and the node 334. Thus, the matching classification rule is the rule associated with the matching node of the bottom level (i.e., the node 314) and is the rule 1 of Table 200.

Accordingly, the embodiments of the present invention provide a method for constructing a single classification structure based on a plurality of classification rules in such a manner as to enable single pass classification that always provides a concrete result. Although various embodiments have been shown and described in detail herein, those skilled in the art can readily devise many other varied embodiments that still incorporate the described teachings.

What is claimed is:

1. A method for building a classification tree structure configured to enable single pass classification of a received packet according to a plurality of rules, each rule having associated with it a plurality of fields, each field having associated with it a priority level, the method comprising:

for a top priority level, performing the steps of:
creating a node for each unique value within fields of the top priority level;
identifying, for each of the nodes within the top priority level, a respective set of one or more rules matching the corresponding node value;
selecting from the created nodes a head node;
creating logical decision paths from the head node to the other nodes within the top priority level;
creating logical decision paths from nodes within the top priority level to a next lower priority level; and for each of any remaining priority levels, performing the steps of:
creating, for each of the logical decision paths received from a next higher priority level, a respective sub-tree including only those nodes and related logical decision paths necessary to satisfy rules associated with a respective next higher priority level node;
creating, for each non-lowest priority level, logical decision paths from nodes within the current priority level to a next lower priority level;

wherein the classification tree structure is a ternary classification tree structure.

2. The method of claim 1, wherein at least one logical decision path includes a wildcard node.

3. The method of claim 1, wherein at least one logical decision path includes an unmatched node.

4. The method of claim 3, wherein if a logical decision path includes an unmatched node within a first level of the ternary classification tree structure then a respective sub-tree has no wildcard nodes at the first level, wherein the sub-tree contains a portion of the logical decision path at the first level.

5. The method of claim 1, wherein the head node is one of: a node selected randomly and a node selected according to a predefined function.

6. The method of claim 5, wherein the head node is one of: a first created node, a node having a middle value, a node having a median value, and a node having an average value.

7. The method of claim 1, wherein the step of creating the respective sub-tree comprises:
building a top level of the sub-tree, the step of building the top level of the sub-tree comprising:
creating a node for each unique value within fields of the top level of a subset of the plurality of rules;
identifying, for each of the nodes within the top level, a respective set of one or more rules matching the corresponding node value using the subset of the plurality of rules;
selecting from the created nodes a head node;
creating logical decision paths from the head node to the other nodes within the top level; and
creating logical decision paths from nodes within the top priority level to a next lower priority level;
wherein the subset of the plurality of rules includes matching rules of a node having a next higher priority level to the top level and is associated with the sub-tree.

8. The method of claim 1, wherein the step of creating the logical decision paths from the head node to the other nodes within the top priority level comprises:
forming a first node group comprising nodes of the top priority level having values greater than a value of the head node;
forming a second node group comprising nodes of the top priority level having values lower than the value of the head node;
selecting a first child of the head node from the first node group; and
selecting a second child of the head node from the second node group.

9. The method of claim 8, wherein the first child is a node having a next greater value as compared to the value of the head node and the second child is a node having a next lower value as compared to the value of the head node, the step of creating the logical decision paths from the head node to the other nodes within the top priority level further comprising:
for each node of the first node group, except a node having the greatest value, selecting a child node, wherein a value of the child node is a next greater value when compared to a value of the node;
for each node of the second node group, except a node having the lowest value, selecting a child node, wherein a value of the child node is a next lower value when compared to a value of the node.

10. A non-transitory computer-readable storage medium having stored thereon instructions for controlling a computer system to perform a method of building a classification tree structure configured to enable single pass classification of a received packet according to a plurality of rules, each rule having associated with it a plurality of fields, each field having associated with it a priority level, the method comprising:
for a top priority level, performing the steps of:
creating a node for each unique value within fields of the top priority level;
identifying, for each of the nodes within the top priority level, a respective set of one or more rules matching the corresponding node value;
selecting from the created nodes a head node;
creating logical decision paths from the head node to the other nodes within the top priority level;
creating logical decision paths from nodes within the top priority level to a next lower priority level; and
for each of any remaining priority levels, performing the steps of:
creating, for each of the logical decision paths received from a next higher priority level, a respective sub-tree including only those nodes and related logical decision paths necessary to satisfy rules associated with a respective next higher priority level node;
creating, for each non-lowest priority level, logical decision paths from nodes within the current priority level to a next lower priority level;
wherein the classification tree structure is a ternary classification tree structure.

11. A method for classifying incoming data packets, the method comprising:
receiving a data packet comprising a plurality of packet fields, each field having associated with it a different priority level; and
determining a classification rule matching the data packet via single pass of a ternary classification tree structure representing multiple classification rules, the ternary classification tree structure comprising a plurality of levels, wherein a top level of the ternary classification tree structure corresponds to a highest priority level and each next level of the ternary classification tree structure corresponds to a next lower priority level, wherein the determining step comprises:
selecting a packet field, the selected packet field associated with the highest priority level;
proceeding along a logical decision path corresponding to the data packet within the ternary classification tree structure, level-by-level, starting with a root node at the top level and moving toward a bottom level, wherein for each level of the ternary classification tree structure:
comparing a value of the selected packet field to nodes of the logical decision path running within the current level of the ternary classification tree structure to find a matching node, the matching node having a value the same as a value of the selected packet field, wherein the matching node defines the logical decision path to a next lower level of the ternary classification tree structure; and
for each non-lowest level, upon finding the matching node, selecting a packet field having a next lower priority level; and
upon finding a matching node of the bottom level, providing a classification rule associated with the found matching node as the classification rule matching the data packet.

12. The method of claim 11, further comprising:
applying a pre-defined action to the packet when no matching classification rule has been identified.

13. The method of claim 12, wherein the pre-defined action is one of: dropping the packet, quarantining the packet, and transmitting the packet toward a destination address of the packet.

14. The method of claim 11, further comprising:
if the logical decision path for the data packet reaches an unmatched node at one of plurality of levels, providing information that the data packet has no matching classification rules.

15. The method of claim 14, wherein the provided information includes additional data comprising at least one of packet fields corresponding to each of levels preceding the one of the plurality of levels and a packet field corresponding to the one of the plurality of levels.

16. The method of claim 11, wherein the step of determining the logical decision path within a current level comprises:
comparing a value of a head node of current level with a value of a corresponding packet field to determine a next node of the logical decision path, wherein, when the current level is the top level, the head node is the root node, and wherein, when the current level is not the top level, the head node is defined by the logical decision path at a previous level;
upon determining that the value of the head node is lower than the value of the packet field, selecting a first child of the head node as the next node, the first child having a value greater than the value of the root node; and
upon determining that the value of the head node is greater than the value of the packet field, selecting a second child of the head node as the next node, the second child having a value lower than the value of the root node.

17. The method of claim 16, wherein the step of determining the logical path within the current level further comprises:
until the logical decision path reaches the matching node or unmatched node within the current level, selecting a next node of the logical decision path within the current level, wherein:
the next node is a first child of a preceding node if a value of the preceding node is lower than the value of the packet field; and
the next node is a second child of the preceding node if the value of the preceding node is greater than the value of the packet field.

18. A non-transitory computer-readable storage medium having stored thereon instructions for controlling a computer system to perform a method for classifying incoming data packets, the method comprising:
receiving a data packet comprising a plurality of packet fields, each field having associated with it a different priority level; and
determining a classification rule matching the data packet via single pass of a ternary classification tree structure representing multiple classification rules, the ternary classification tree structure comprising a plurality of levels, wherein a top level of the ternary classification tree structure corresponds to a highest priority level and each next level of the ternary classification tree structure corresponds to a next lower priority level, wherein the determining step comprises:
selecting a packet field, the selected packet field associated with the highest priority level;
proceeding along a logical decision path corresponding to the data packet within the ternary classification tree structure, level-by-level, starting with a root node at the top level and moving toward a bottom level, wherein for each level of the ternary classification tree structure:
comparing a value of the selected packet field to nodes of the logical decision path running within the current level of the ternary classification tree structure to find a matching node, the matching node having a value the same as a value of the selected packet field, wherein the matching node defines the logical decision path to a next lower level of the ternary classification tree structure; and
for each non-lowest level, upon finding the matching node, selecting a packet field having a next lower priority level; and
upon finding a matching node of the bottom level, providing a classification rule associated with the found matching node as the classification rule matching the data packet.

19. A packet processor comprising:
a memory for storing a ternary classification tree structure representing a plurality of classification rules, each rule having associated with it a plurality of fields, each field having associated with it a priority level, wherein the ternary classification tree structure comprises a plurality of levels, a top level of the classification tree representing a highest priority level and each next level of the ternary classification tree structure corresponds to a next lower priority level; and
a processor for determining a classification rule matching an incoming data packet via a single pass of the ternary classification tree structure using a method for classifying data packets, wherein the data packet comprises a plurality of packet fields, each field having associated with it a different priority level, and wherein the method comprises:
selecting a packet field, the selected packet field associated with the highest priority level;
proceeding along a logical decision path corresponding to the data packet within the ternary classification tree structure, level-by-level, starting with a root node at the top level and moving toward a bottom level, wherein for each level of the ternary classification tree structure:
comparing a value of the selected packet field to nodes of the logical decision path running within the current level of the ternary classification tree structure to find a matching node, the matching node having a value the same as a value of the selected packet field, wherein the matching node defines the logical decision path to a next lower level of the ternary classification tree structure; and
for each non-lowest level, upon finding the matching node, selecting a packet field having a next lower priority level; and
upon finding a matching node of the bottom level, providing a classification rule associated with the found matching node as the classification rule matching the data packet.

20. The packet processor of claim 19, wherein a network router receives the data packet and provides the data packet to the packet processor for determining the matching classification rule, wherein the network router is configured to apply to the data packet an action associated with the determined matching classification rule.

* * * * *